United States Patent
Chen et al.

(10) Patent No.: US 11,665,386 B2
(45) Date of Patent: May 30, 2023

(54) METHOD FOR CO-HOSTING, AND ELECTRONIC DEVICE

(71) Applicant: BEIJING DAJIA INTERNET INFORMATION TECHNOLOGY CO., LTD., Beijing (CN)

(72) Inventors: Jinxiong Chen, Beijing (CN); Yu Lei, Beijing (CN); Peiqiang Tan, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/396,965

(22) Filed: Aug. 9, 2021

(65) Prior Publication Data

US 2022/0132176 A1 Apr. 28, 2022

(30) Foreign Application Priority Data

Oct. 28, 2020 (CN) .......................... 202011172660.X

(51) Int. Cl.
*H04N 21/239* (2011.01)
*H04N 21/2187* (2011.01)
(Continued)

(52) U.S. Cl.
CPC ....... *H04N 21/239* (2013.01); *H04N 21/2187* (2013.01); *H04N 21/234* (2013.01); *H04N 21/236* (2013.01)

(58) Field of Classification Search
CPC ............. H04N 21/239; H04N 21/2187; H04N 21/234; H04N 21/236
See application file for complete search history.

(56) References Cited

U.S. PATENT DOCUMENTS

| 11,082,467 B1 * | 8/2021 | Hartnett | H04L 65/1069 |
| 2017/0257646 A1 * | 9/2017 | Wu | H04N 21/23103 |

(Continued)

FOREIGN PATENT DOCUMENTS

| CN | 107070866 A | 8/2017 |
| CN | 109618191 A | 4/2019 |

(Continued)

OTHER PUBLICATIONS

European Patent Office, European Search Report pursuant to Rule 61 EPC, dated Jan. 31, 2022 in Patent Application No. 21190434.7, which this application claims priority.
Communication pursuant to Article 94(3) EPC of European Application No. 21190434.7 dated Feb. 11, 2022.

(Continued)

*Primary Examiner* — Adil Ocak
(74) *Attorney, Agent, or Firm* — Kolitch Romano Dascenzo Gates LLC

(57) ABSTRACT

A method for co-hosting and an electronic device are disclosed. In the method, a co-hosting establishment instruction is acquired; configuration information of the first live streaming client is acquired in response to the co-hosting establishment instruction; first communication protocol information corresponding to a co-hosting process is acquired from the configuration information; and co-hosting with a second live streaming client is established based on the first communication protocol information. The co-hosting process is a general process in different types of co-hosting services, and includes a co-hosting establishment process.

18 Claims, 10 Drawing Sheets

(51) Int. Cl.
*H04N 21/234* (2011.01)
*H04N 21/236* (2011.01)

(56) References Cited

U.S. PATENT DOCUMENTS

| | | | | |
|---|---|---|---|---|
| 2020/0076754 | A1* | 3/2020 | Kim | H04L 51/222 |
| 2021/0306700 | A1* | 9/2021 | Xie | H04N 21/8545 |
| 2022/0038513 | A1 | 2/2022 | Wei | |

FOREIGN PATENT DOCUMENTS

| | | |
|---|---|---|
| CN | 111107441 A | 5/2020 |
| CN | 111372090 A | 7/2020 |
| CN | 111385349 A | 7/2020 |
| CN | 111385592 A | 7/2020 |

OTHER PUBLICATIONS

The State Intellectual Property Office of People's Republic of China, First Office Action in Patent Application No. CN202011172660.X dated Apr. 6, 2022, which is a foreign counterpart application corresponding to this U.S. Patent Application, to which this application claims priority.

Mahy, R., et al.;"The Session Initiation Protocol (SIP) "Join" Header"; rfc3911. txt, Internet Engineering Task Force, IEIF; Standard, Internet Society (ISOC) 4, Rue Des Falaises CH-1205 Geneva, Switzerland, Oct. 1, 2004.

Rosenberg, J., et al.; "SIP: Session Initiation Protocol", http://www.sanface.ccm/txt2pdf.html; Jun. 1, 2002, pp. 1-269.

Singh, Aameek, et al.; "SPLAT: A Unified SIP Services Platform for VoIP Applications", International Journal of Communication Systems., vol. 19, No. 4, May 1, 2006, pp. 425-444.

* cited by examiner

METHOD FOR CO-HOSTING, AND ELECTRONIC DEVICE

CROSS-REFERENCE TO RELATED APPLICATION

This application is based on and claims priority to Chinese Patent Application No. 202011172660.X, filed on Oct. 28, 2020, the disclosure of which is herein incorporated by reference in its entirety.

TECHNICAL FIELD

The present disclosure relates to the technical field of the Internet, and in particular, relates to a method for co-hosting, and an electronic device thereof.

BACKGROUND

With the development of the Internet technology and booming of live streaming, the co-hosting function has become a common function in the field of live streaming. The co-hosting function refers to a function of allowing at least two users to join live streaming in the same live streaming room. Co-hosting by using the co-hosting function can enhance interaction in the live streaming room and enrich live content of the live streaming room.

SUMMARY

Embodiments of the present disclosure provide a method for co-hosting, and an electronic device.

According to one aspect of the embodiments of the present disclosure, a method for co-hosting is provided. The method includes: acquiring a co-hosting establishment instruction, the co-hosting establishment instruction being intended to instruct a first live streaming client to establish co-hosting with a second live streaming client; acquiring configuration information of the first live streaming client in response to the co-hosting establishment instruction, the configuration information including communication protocol information corresponding to a co-hosting process, the co-hosting process being a general process in different types of co-hosting services, the co-hosting process including a co-hosting establishment process; acquiring first communication protocol information corresponding to the co-hosting establishment process from the configuration information; and establishing the co-hosting with the second live streaming client based on the first communication protocol information.

According to another aspect of the embodiments of the present disclosure, an electronic device is provided. The electronic device includes: at least one processor; and a volatile or non-volatile memory configured to store at least one instruction executable by the at least one processor; wherein the at least one processor, when loading and executing the at least one instruction, is caused to perform: acquiring a co-hosting establishment instruction, the co-hosting establishment instruction being intended to instruct a first live streaming client to establish co-hosting with a second live streaming client; acquiring configuration information of the first live streaming client in response to the co-hosting establishment instruction, the configuration information including communication protocol information corresponding to a co-hosting process, the co-hosting process being a general process in different types of co-hosting services, the co-hosting process including a co-hosting establishment process; acquiring first communication protocol information corresponding to the co-hosting establishment process from the configuration information; and establishing the co-hosting with the second live streaming client based on the first communication protocol information.

According to still another aspect of the embodiments of the present disclosure, a non-transitory computer-readable storage medium including at least one instruction therein is provided. The at least one instruction, when loaded and executed by a processor of an electronic device, causes the electronic device to perform: acquiring a co-hosting establishment instruction, the co-hosting establishment instruction being intended to instruct a first live streaming client to establish co-hosting with a second live streaming client; acquiring configuration information of the first live streaming client in response to the co-hosting establishment instruction, the configuration information including communication protocol information corresponding to a co-hosting process, the co-hosting process being a general process in different types of co-hosting services, the co-hosting process including a co-hosting establishment process; acquiring first communication protocol information corresponding to the co-hosting establishment process from the configuration information; and establishing the co-hosting with the second live streaming client based on the first communication protocol information.

According to still another aspect of the embodiments of the present disclosure, a computer program product including at least one instruction executable by a processor of an electronic device is provided. The at least one instruction, when loaded and executed by the processor of the electronic device, causes the electronic device to perform: acquiring a co-hosting establishment instruction, the co-hosting establishment instruction being intended to instruct a first live streaming client to establish co-hosting with a second live streaming client; acquiring configuration information of the first live streaming client in response to the co-hosting establishment instruction, the configuration information including communication protocol information corresponding to a co-hosting process, the co-hosting process being a general process in different types of co-hosting services, the co-hosting process including a co-hosting establishment process; acquiring first communication protocol information corresponding to the co-hosting establishment process from the configuration information; and establishing the co-hosting with the second live streaming client based on the first communication protocol information.

BRIEF DESCRIPTION OF THE DRAWINGS

The accompanying drawings, which are incorporated in and constitute a part of this description, illustrate the examples of the present disclosure and together with the description, serve to explain the principles of the present disclosure.

DETAILED DESCRIPTION

The co-hosting function is implemented by a co-hosting service in a live streaming application. The co-hosting service includes a process of establishing co-hosting, a process in a co-hosting state and a process of canceling the co-hosting. Different types of co-hosting services, e.g., co-hosting between anchors or co-hosting between an anchor and a viewer, use different communication protocol information. When developing different types of co-hosting services, technicians need to develop different communication protocol information separately.

It should be noted that the terms "first," "second," and the like in the specification, claims, and accompanying drawings of the present disclosure are intended to distinguish between similar objects but do not necessarily indicate a specific order or sequence. It should be understood that the data used in such a way may be exchanged under proper conditions to make it possible to implement the described embodiments of present disclosure in sequences except those illustrated or described herein. The embodiments and practice thereof described herein do not represent all embodiments and practice consistent with the present disclosure. On the contrary, these embodiments and practice are only embodiments of a device and a method detailed in the appended claims and consistent with some aspects of the present disclosure.

Figure 1:
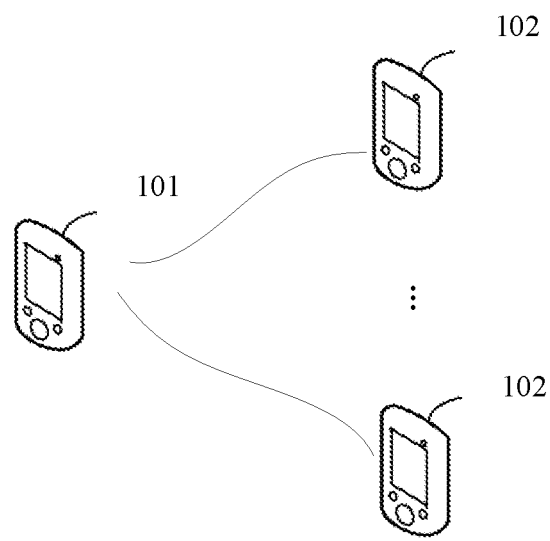
FIG. 1 is a schematic diagram of a system for co-hosting according to an exemplary embodiment of the present disclosure.

FIG. 1 is a schematic diagram of a system for co-hosting according to an exemplary embodiment. The system includes: a first terminal 101 and at least one second terminal 102, wherein the first terminal 101 and the second terminal 102 are connected over a network.

The first terminal 101 is a terminal initiating a co-hosting invitation, and the second terminal 102 is an invited terminal. The first terminal 101 invites the second terminal 102 to join co-hosting. The first terminal 101 and the second terminal 102 may be various types of terminals such as a portable terminal, a pocket terminal, and a handheld terminal, e.g., a mobile phone, a computer, and a tablet computer.

Figure 2:
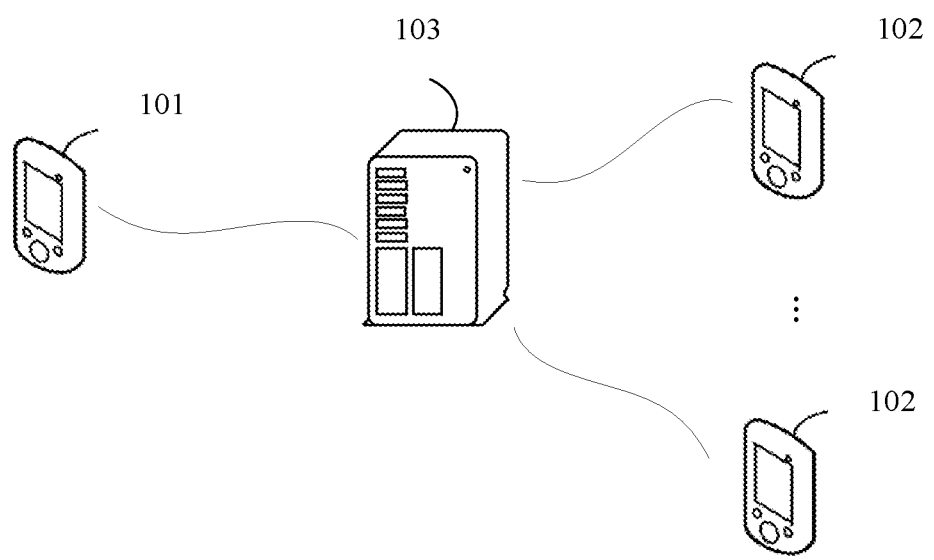
FIG. 2 is a schematic diagram of another system for co-hosting according to an exemplary embodiment of the present disclosure.

In some embodiments, as shown in FIG. 2, the system further includes a server 103. The first terminal 101 and the server 103 are connected over a network, the second terminal 102 and the server 103 are connected over a network, and the co-hosting between the first terminal 101 and the second terminal 102 is implemented over the server 103. The server 103 is one server, or a server cluster consisting of a plurality of servers, or a cloud computing service center.

Figure 3:
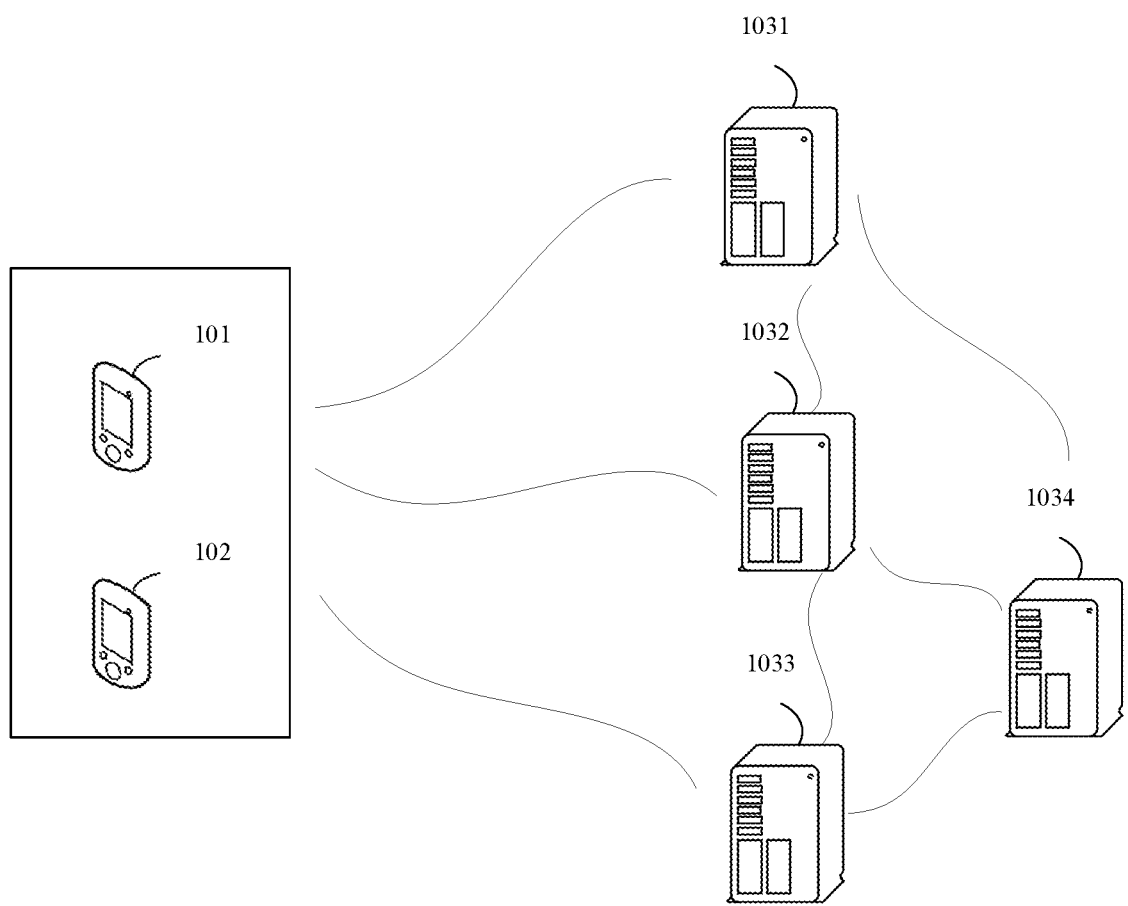
FIG. 3 is a schematic diagram of another system for co-hosting according to an exemplary embodiment of the present disclosure.

In some embodiments, as shown in FIG. 3, the system further includes a first server 1031, a second server 1032, a third server 1033, and a fourth server 1034. The first terminal 101 and the second terminal 102 are connected to the first server 1031, the second server 1032, and the third server 1033 over a network; and the fourth server 1034 is connected to the first server 1031 and the third server 1033 over a network.

The first server 1031 is configured to manage a co-hosting process. The second server 1032 is configured to deliver a signaling to the terminal. The third server 1033 is configured to process live streaming data in the co-hosting process. The fourth server 1034 is configured to manage a co-hosting room.

The method according to the embodiments of the present disclosure is applicable to a scenario of co-hosting in live streaming.

For example, the method is applied to a scenario of co-hosting between anchors.

In the case that a first anchor and a second anchor are both making live streaming, the first anchor can invite the second anchor to join co-hosting. In this case, the first terminal corresponding to the first anchor can invite, by using the method for co-hosting according to the embodiments of the present disclosure, the second terminal corresponding to the second anchor to join the co-hosting, thus implementing interaction between the anchors.

For another example, the method is applied to a scenario of co-hosting between an anchor and a viewer.

Figure 4:
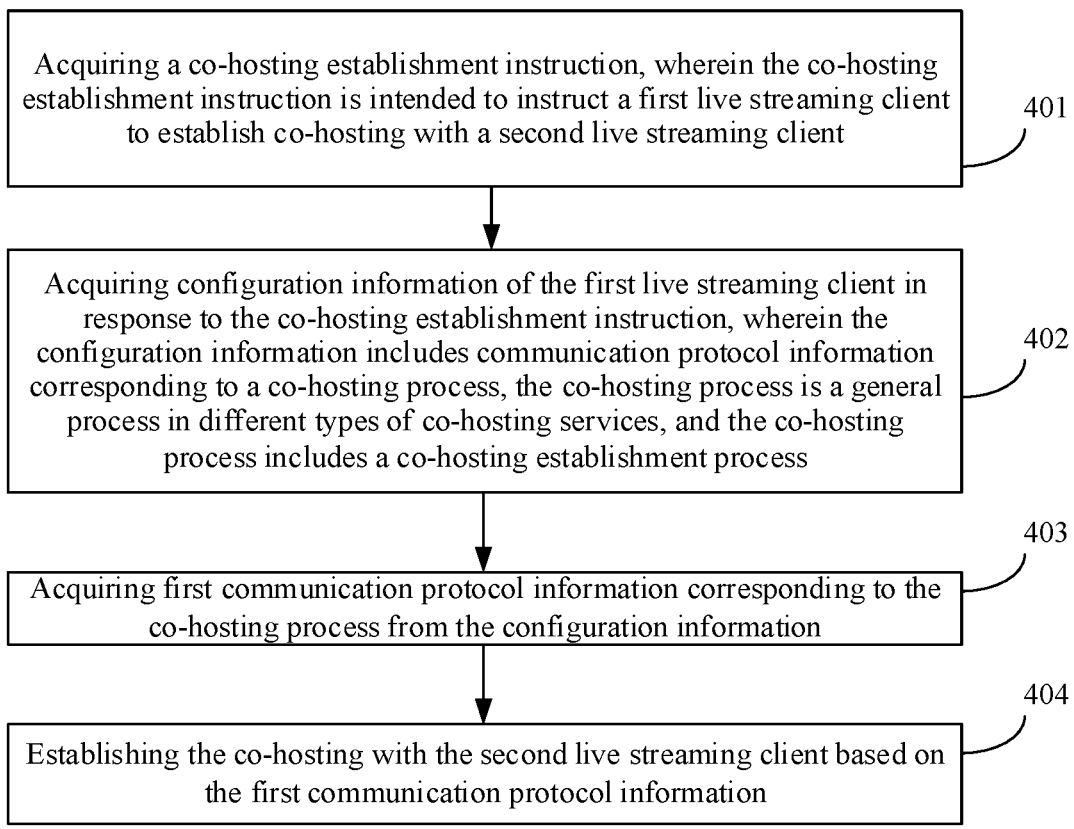
FIG. 4 is a flowchart of a method for co-hosting according to an exemplary embodiment of the present disclosure.

In a live streaming process, the first terminal corresponding to the anchor can invite, by using the method for co-hosting according to the embodiments of the present disclosure, the terminal corresponding to the viewer to join the co-hosting, thereby implementing interaction between the anchor and the viewer FIG. 4 is a flowchart of a method for co-hosting according to an exemplary embodiment. Referring to FIG. 4, the method is applicable to a first terminal and includes the following processes:

In 401, the first terminal acquires a co-hosting establishment instruction, wherein the co-hosting establishment instruction is intended to instruct a first live streaming client to establish co-hosting with a second live streaming client.

In 402, the first terminal acquires configuration information of the first live streaming client in response to the co-hosting establishment instruction, wherein the configuration information includes communication protocol information corresponding to a co-hosting process. The co-hosting process is a general process in different types of co-hosting services, that is, the co-hosting process corresponds to a same process or a common process in different types of co-hosting services. The co-hosting process includes a co-hosting establishment process. There are different types of co-hosting services. For example, based on objects to which at least two terminals in the co-hosting belong, the co-hosting services include co-hosting between an anchor and a viewer, and co-hosting between anchors; based on user operations in the case that co-hosting is established, the co-hosting services include a live streaming co-hosting between anchors, and PK (competitive and challenging) co-hosting between anchors.

In 403, the first terminal acquires first communication protocol information corresponding to the co-hosting process from the configuration information.

In 404, the first terminal establishes the co-hosting with the second live streaming client based on the first communication protocol information.

In the method for co-hosting according to this embodiment of the present disclosure, the configuration information includes the communication protocol information corresponding to the same co-hosting process and the communication protocol information is applicable to different types of co-hosting services. Therefore, for any type of co-hosting service, the communication protocol information can be directly used during establishment of co-hosting. It is no longer necessary to separately develop communication protocol information for different types of co-hosting services, thereby avoiding repeated development of communication protocol information, improving the reusability of the communication protocol information, and reducing the development costs.

In some embodiments, the co-hosting establishment instruction is intended to instruct the first live streaming client to establish co-hosting of a target type with the second live streaming client, and the configuration information further includes address information corresponding to a co-hosting service of the target type; and establishing the co-hosting with the second live streaming client based on the first communication protocol information includes:

establishing the co-hosting of the target type with the second live streaming client by calling, based on the first communication protocol information and the address information, a co-hosting service corresponding to the address information.

In some embodiments, the method further includes:

acquiring original configuration information, the original configuration information including the communication protocol information corresponding the co-hosting process; and acquiring the configuration information by adding the address information to the original configuration information.

In some embodiments, establishing the co-hosting with the second live streaming client based on the first communication protocol information includes:

creating, based on the first communication protocol information, a second co-hosting request satisfying the first communication protocol information, the second co-hosting request being intended to request a server to establish the co-hosting between the first live streaming client and the second live streaming client;

sending the second co-hosting request to the server, the server being configured to send the second co-hosting request to the second live streaming client and receive a co-hosting acceptance response from the second live streaming client; and establishing the co-hosting of the target type with the second live streaming client by calling, in response to the co-hosting acceptance response from the server, the co-hosting service corresponding to the address information.

In some embodiments, sending the second co-hosting request to the server includes:

determining, based on the first communication protocol information, a first interface for sending the second co-hosting request; and sending the second co-hosting request to the server by calling the first interface.

In some embodiments, creating, based on the first communication protocol information, the second co-hosting request satisfying the first communication protocol information includes:

determining, based on the first communication protocol information, a format of the second co-hosting request; and creating, based on the format, the second co-hosting request matching the format.

In some embodiments, calling, in response to the co-hosting acceptance response from the server, the co-hosting service corresponding to the address information includes:

receiving co-hosting information from the server, the co-hosting information being delivered by the server in response to receiving the co-hosting acceptance response from the second live streaming client; and calling, based on the co-hosting information, the co-hosting service corresponding to the address information in response to the co-hosting acceptance response.

In some embodiments, the co-hosting service includes sending live streaming data to the server, and the co-hosting information includes a second interface for establishing a communication connection; and calling, based on the co-hosting information, the co-hosting service corresponding to the address information in response to the co-hosting acceptance response includes:

establishing the communication connection with the server by calling, based on the first communication protocol information, the second interface in response to the co-hosting acceptance response, the communication connection indicating that the co-hosting with the second live streaming client has been established; and sending the live streaming data to the server over the communication connection.

In some embodiments, the co-hosting information includes co-hosting position identifiers, the co-hosting position identifiers indicating co-hosting positions assigned to the first live streaming client and the second live streaming client for co-hosting; and calling, based on the co-hosting information, the co-hosting service corresponding to the address information includes:

determining, based on the first communication protocol information, a co-hosting position identifier corresponding to the first live streaming client; and releasing the live streaming data in a co-hosting room based on a co-hosting position corresponding to the co-hosting position identifier.

In some embodiments, the co-hosting process includes a co-hosting termination process; and the method further includes:

acquiring a co-hosting termination instruction, the co-hosting termination instruction being intended to instruct to terminate the co-hosting between the first live streaming client and the second live streaming client;

acquiring, in response to the co-hosting termination instruction, second communication protocol information corresponding to the co-hosting termination process from the configuration information; and terminating the co-hosting with the second live streaming client based on the second communication protocol information.

In some embodiments, terminating the co-hosting with the second live streaming client based on the second communication protocol information includes:

creating, based on the second communication protocol information, a second co-hosting termination request satisfying the second communication protocol information, the second co-hosting termination request being intended to request a server to terminate the co-hosting between the first live streaming client and the second live streaming client; and sending the second co-hosting termination request to the server, the server being configured to terminate the co-hosting with the second live streaming client in response to the second co-hosting termination request In some embodiments, sending the second co-hosting termination request to the server includes:

determining, based on the second communication protocol information, a third interface for sending the second co-hosting termination request; and sending the second co-hosting termination request to the server by calling the third interface.

Figure 5:
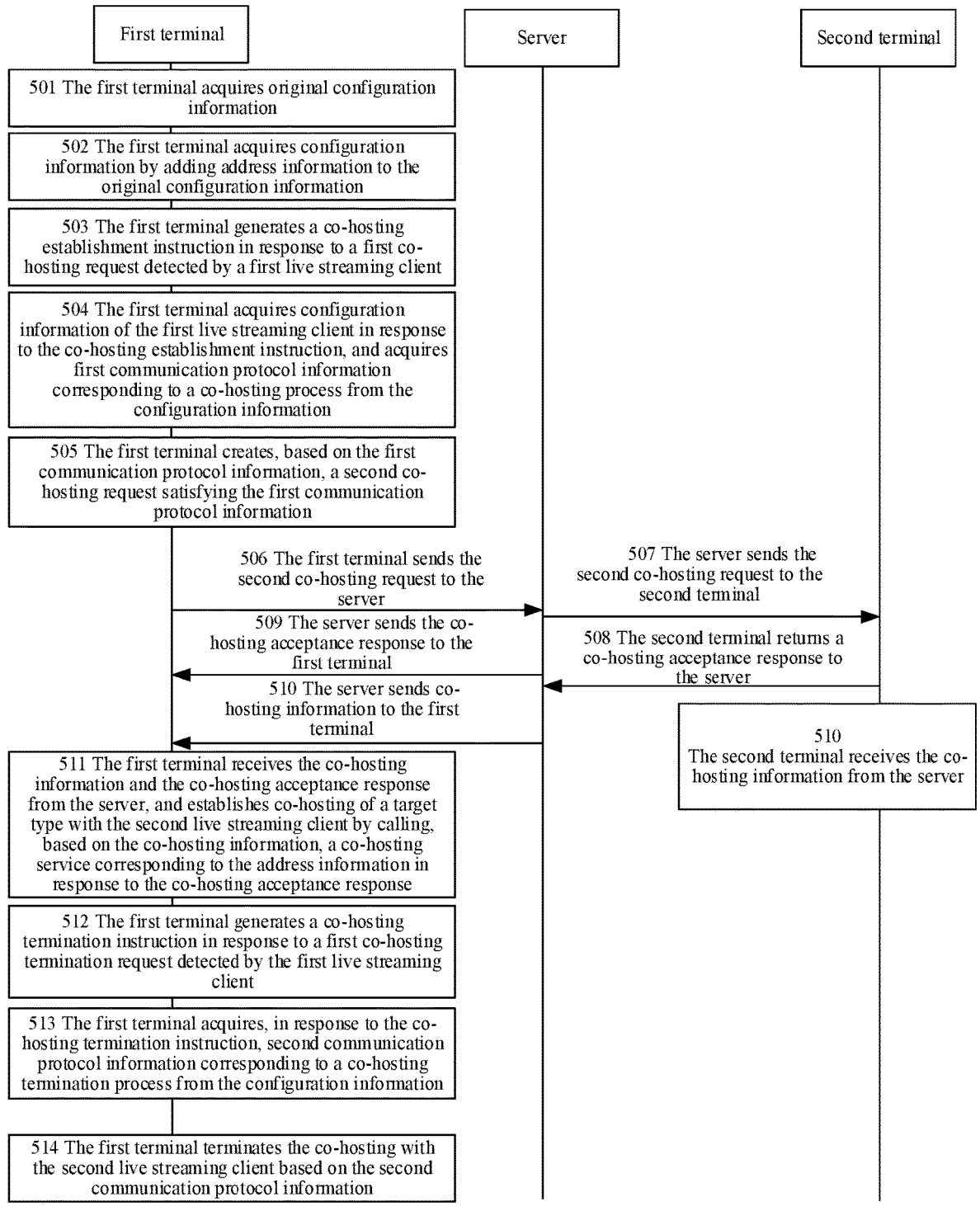
FIG. 5 is a flowchart of another method for co-hosting according to an exemplary embodiment of the present disclosure.

In some embodiments, the method further includes:

determining that the first live streaming client is a co-hosting waiting state in response to sending the second co-hosting request and prior to receiving a response from the second live streaming client; or determining, in response to receiving a co-hosting acceptance response from the second live streaming client, that the first live streaming client is in a co-hosting establishing state; or determining, in response to sending the second co-hosting termination request, that the first live streaming client is in a co-hosting terminating state FIG. 5 is a flowchart of another method for co-hosting according to an exemplary embodiment. Referring to FIG. 5, interaction entities in the method include a first terminal, a second terminal, and a server. The method includes the following processes:

In 501, the first terminal acquires original configuration information.

In the embodiments of the present disclosure, a co-hosting service refers to a service for establishing co-hosting between at least two terminals. There are different types of co-hosting services. For example, based on objects to which at least two terminals in the co-hosting belong, the co-hosting services include co-hosting between an anchor and a viewer, and co-hosting between anchors; based on user operations in the case that co-hosting is established, the co-hosting services include a live streaming co-hosting between anchors, and PK (competitive and challenging) co-hosting between anchors. In the case of a live streaming co-hosting between anchors, live streaming data of the two anchors is displayed in their live streaming rooms in the case that co-hosting is established. In the case of PK co-hosting between anchors, the live streaming data of the two anchors is displayed in the live streaming rooms, and besides, the anchors can compete against each other in terms of gifts from viewers in their live streaming rooms.

For different types of co-hosting services, any two different types of co-hosting services may include the same co-hosting establishment process, such as a process including establishing co-hosting, terminating co-hosting, and the like, and also include some unique processes. For example, in the case of co-hosting between anchors, the service includes a process of displaying live streaming data in the live streaming rooms of the two anchors respectively in the case that the co-hosting is established; in the case of co-hosting between an anchor and a viewer, the service includes a process of displaying live streaming data only in the live streaming room of the anchor in the case that the co-hosting is established.

In some embodiments, for the process of establishing co-hosting, in the case of co-hosting between an anchor and a viewer, a terminal corresponding to the anchor needs to send a co-hosting request to a terminal corresponding to the viewer, and in the case that the terminal corresponding to the viewer returns a co-hosting acceptance response, co-hosting is established between the two terminals; in the case of co-hosting between anchors, a terminal corresponding to the first anchor needs to send a co-hosting request to a terminal corresponding to the second anchor, and in the case that the terminal corresponding to the second anchor returns a co-hosting acceptance response, co-hosting is established between the two terminals.

For the process of displaying live streaming data, in the case of co-hosting between an anchor and a viewer, live streaming data of the anchor and voice data of the viewer during the co-hosting need to be released to the live streaming room of the anchor; in the case of co-hosting between anchors, live streaming data of the two anchors needs to be mixed and released to the live streaming rooms of the two anchors during the co-hosting. In addition, for the co-hosting between the anchor and the viewer, it is only necessary to mix voice data of the anchor with voice data of the viewer, while for the co-hosting between anchors, it is necessary to mix not only the voice data of the two anchors to obtain mixed voice data, but also video data of the two anchors to obtain mixed video data.

For the same co-hosting process, in the case that the corresponding configuration information is set separately for each type of co-hosting service, the configuration information corresponding to the same co-hosting process may be set repeatedly. To avoid this situation, the configuration information applicable to the same co-hosting process in various co-hosting services is set in the embodiments of the present disclosure, such that the configuration information can be used during development of different types of co-hosting services.

Accordingly, during development of corresponding code, in the case that code is developed separately for each type of co-hosting service, the code corresponding to the same co-hosting process may be developed repeatedly. To avoid this situation, the code developed based on the configuration information of the same co-hosting process is encapsulated in a software development kit (SDK) in the embodiments of the present disclosure. During development of different types of co-hosting services, it is only necessary to obtain the SDK of the code corresponding to the same co-hosting process.

In the embodiments of the present disclosure, co-hosting between anchors is used as an example for description. The first terminal is the terminal corresponding to the first anchor, and the second terminal is the terminal corresponding to the second anchor. The first terminal invites the second terminal to join the co-hosting, and establishes the co-hosting between the first terminal and the second terminal. The original configuration information includes communication protocol information corresponding to the co-hosting establishment process in different types of co-hosting services, and the co-hosting process is a general process in different types of co-hosting services, i.e., the original configuration information is applicable to different types of co-hosting services. The original configuration information is pre-stored in the first terminal. The communication protocol information includes types of interaction signalings in each type of co-hosting service, interaction content in the interaction signalings, and a format of the interaction content.

The types of interaction signalings include: establishing co-hosting, accepting co-hosting, rejecting co-hosting, and terminating co-hosting. From another perspective, the interaction signalings includes various requests from terminals, signalings corresponding to the requests, and responses corresponding to the requests. The interaction content refers to information included in the signalings. The format of the interaction content is a format of a request created based on a received instruction, and a format of a response returned corresponding to a received request. For example, the format of the request specifies a length of a string in the request, accounts included in the request, and the like, and the format of the response specifies a length of a string in the response, accounts included in the response, "accept" or "reject," or the like.

Accordingly, a second SDK, which is obtained by encapsulating code developed based on the original configuration information, is pre-stored in the first terminal. The second SDK includes generic code corresponding to the co-hosting establishment process in different types of co-hosting services, i.e., the second SDK is applicable to different types of co-hosting services. The generic code is compiled based on the communication protocol information.

In 502, the first terminal acquires configuration information by adding address information to the original configuration information.

In the embodiments of the present disclosure, in the process of co-hosting, a corresponding co-hosting service needs to be called in order to realize the co-hosting; in addition, different types of co-hosting services have different storage addresses, i.e., different types of co-hosting services have different address information. Therefore, the address information of the co-hosting services needs to be configured, so as to call, based on the address information, a co-hosting service corresponding to the address information.

The address information is a domain name, an Internet Protocol (IP) address and other information.

In some embodiments, in the case that the address information is not included in the original configuration information, the address information is added to the original configuration information and the configuration information is acquired; or, in the case that the address information is already included in the original configuration information, but the co-hosting service corresponding to the address information is not the currently required co-hosting service, the original address information is replaced and the configuration information is acquired. The configuration information is configuration information corresponding to the currently required co-hosting service, and the configuration information includes not only the communication protocol information corresponding to the same co-hosting process in different types of co-hosting servers, but also the address information corresponding to the currently required co-hosting service.

Accordingly, for the second SDK and the first SDK, in the case that the address information is not included in the second SDK, the address information is added to the second SDK and thus the first SDK is acquired; or, in the case that the address information is already included in the second SDK, but the co-hosting service corresponding to the address information is not the currently required co-hosting service, the original address information is replaced and the first SDK is acquired. The first SDK is an SDK corresponding to the currently required co-hosting service, including not only the generic code corresponding to the same co-hosting process in different types of co-hosting servers, but also the address information corresponding to the currently required co-hosting service.

In 503, the first terminal generates a co-hosting establishment instruction in response to a first co-hosting request detected by a first live streaming client.

The co-hosting establishment instruction is intended to instruct the first terminal to establish co-hosting with the second terminal, that is, for instructing the first live streaming client installed in the first terminal to establish co-hosting with a second live streaming client installed in the second terminal. The first live streaming client and the second live streaming client are live streaming clients of the same type.

In the embodiments of the present disclosure, the first terminal acquires the co-hosting establishment instruction based on the first live streaming client. That is, the first terminal generates the co-hosting establishment instruction based on a detected operation performed by the first living stream client. The operation is performed by a user, and may act as the first co-hosting request.

In some embodiments, the first terminal displays a live streaming interface over the first live streaming client. The live streaming interface includes a co-hosting button. The first anchor operates the co-hosting button to display a plurality of anchor accounts. The first anchor selects any account from the plurality of accounts, which is an account corresponding to the second terminal to join the co-hosting. The first live streaming client detects the operation of selecting any account and sends a first co-hosting request to the first terminal. The first terminal generates a co-hosting establishment instruction in response to the first co-hosting request from the first live streaming client. The second live streaming client is logged in based on any account.

In some embodiments, the live streaming interface includes a voice co-hosting button and a video co-hosting button. In the case that the first anchor selects the voice co-hosting button, the first terminal generates a co-hosting establishment instruction, wherein the co-hosting establishment instruction instructs to establish voice co-hosting. That is, the two anchors can receive each other's voice data but not video data during the co-hosting process. In the case that the first anchor selects the video co-hosting button, the first terminal generates a co-hosting establishment instruction, wherein the co-hosting establishment instruction instructs to establish a video co-hosting. In other words, the two anchors can receive not only each other's voice data but also video data during the co-hosting process.

In 504, the first terminal acquires configuration information of the first live streaming client in response to the co-hosting establishment instruction, and acquires first communication protocol information corresponding to a co-hosting process from the configuration information.

In the embodiments of the present disclosure, the first terminal acquires the configuration information of the first live streaming client, that is, the first SDK, in response to the co-hosting establishment instruction. The configuration information includes the communication protocol information corresponding to the same co-hosting process in different types of co-hosting servers. The co-hosting process is a general process in different types of co-hosting services, and the co-hosting process at least includes a co-hosting establishment process and a co-hosting termination process.

The co-hosting establishment process is as follows: the first terminal creates a second co-hosting request, and the second terminal returns, in response to the second co-hosting request, a response corresponding to the second co-hosting request to the first terminal.

The communication protocol information is applicable to any type of co-hosting service, which reduces the workload compared with the related technology where communication protocol information between a terminal and a server is configured in development of each type of co-hosting service.

In some embodiments, in the case that co-hosting establishment instruction is intended to instruct the first live streaming client to establish a co-hosting service of a target type with the second live streaming client, the configuration information further includes address information corresponding to the co-hosting service of the target type, and the first terminal further needs to acquire the address information from the configuration. Afterwards, the first terminal establishes co-hosting of the target type with the second live streaming client by calling, based on the first communication protocol information and the address information, the co-hosting service corresponding to the address information. For details about the co-hosting process, reference may be made to processes 505 to 514.

In 505, the first terminal creates, based on the first communication protocol information, a second co-hosting request satisfying the first communication protocol information.

The second co-hosting request is intended to request the server to establish co-hosting between the first live streaming client and the second live streaming client. The second co-hosting request carries a first account corresponding to the first live streaming client and a second account corresponding to the second live streaming client, such that the server can subsequently determine, based on the first account and the second account, the first live streaming client and the second live streaming client between which the co-hosting is established. The first account is the account of the first anchor, and the second account is the account of the second anchor.

In some embodiments, the second co-hosting request further carries a co-hosting type parameter for indicating whether the co-hosting established is voice co-hosting or video co-hosting.

In some embodiments, the first communication protocol information specifies a request format of each request. Thus, the first terminal can determine a format of the second co-hosting request based on the first communication protocol information, and create, based on the format, the second co-hosting request matching the format.

In 506, the first terminal sends the second co-hosting request to the server.

In response to inviting the second live streaming client to join the co-hosting, the first live streaming client sends the second co-hosting request to the second live streaming client over the server.

In some embodiments, the first communication protocol information further specifies corresponding interface information for sending each request. The interface information is intended to indicate the interface for sending each request. Therefore, based on the first communication protocol information, a first interface for sending the second co-hosting request is determined, and the first interface is called to send the second co-hosting request to the server.

In 507, the server sends the second co-hosting request to the second terminal.

In 508, the second terminal returns a co-hosting acceptance response to the server.

In the embodiments of the present disclosure, the second live streaming client in the second terminal receives a co-hosting acceptance instruction and then returns the co-hosting acceptance response to the server. The co-hosting acceptance instruction indicates that the second live streaming client accepts the co-hosting invitation from the first live streaming client.

In some embodiments, in response to receiving the second co-hosting request, the second live streaming client displays an invitation interface that includes an accept button and a reject button. The second anchor selects the accept button in the case of accepting the co-hosting. Then the second live streaming client receives the co-hosting acceptance instruction.

In some embodiments, configuration information is also set in the second live streaming client. In response to receiving the co-hosting acceptance instruction, the second live streaming client acquires the configuration information. The configuration information includes the first communication protocol information corresponding to the co-hosting process, and the response from the second live streaming client is also a part of the co-hosting process. Therefore, the second live streaming client determines a format of a response corresponding to the second co-hosting request based on the first communication protocol information, and determines a co-hosting acceptance response matching the format.

In another embodiment, in the case that the second anchor does not accept the co-hosting, the second anchor presses the reject button. In response to receiving a co-hosting rejection instruction, the second live streaming client returns a co-hosting rejection response to the server, and no further subsequent processes are performed.

In 509, the server sends the co-hosting acceptance response to the first terminal.

The server sends the co-hosting acceptance response to the first live streaming client in the first terminal. In response to receiving the co-hosting acceptance response, the first live streaming client determines that the second live streaming client has accepted the co-hosting invitation, and co-hosting can be established between the first live streaming client and the second live streaming client.

In 510, the server sends co-hosting information to the first terminal.

In response to receiving the co-hosting acceptance response, the server determines that the second live streaming client has accepted the co-hosting invitation from the first live streaming client. At this point, the server sets the co-hosting information such that the first live streaming client and the second live streaming client can establish co-hosting based on the co-hosting information.

In some embodiments, the co-hosting information includes a second interface for establishing a communication connection. That is, the server has configured the second interface, and the first live streaming client has established a communication connection with the server based on the second interface. The second interface is any one of a plurality of application programming interfaces (APIs).

In some embodiments, the co-hosting information further includes co-hosting position identifiers, and the co-hosting position identifiers indicate co-hosting positions assigned to the first live streaming client and the second live streaming client for co-hosting. In other words, the server assigns co-hosting position identifiers to the first live streaming client and the second live streaming client respectively. The first live streaming client and the second live streaming client establish co-hosting based on co-hosting positions corresponding to the co-hosting position identifiers. In the case that the server does not assign the co-hosting position identifier to the second live streaming client, the second live streaming client, even in the case of accepting the co-hosting invitation, cannot join the co-hosting with the first live streaming client.

In 511, the first terminal receives the co-hosting information and the co-hosting acceptance response from the server, and establishes co-hosting of a target type with the second live streaming client by calling, based on the co-hosting information, a co-hosting service corresponding to the address information in response to the co-hosting acceptance response.

The first terminal acquires the address information from the configuration information by the first live streaming client, and calls the co-hosting service corresponding to the address information. The first live streaming client establishes the co-hosting of the target type with the second live streaming client, that is, the co-hosting is implemented between the first live streaming client and the second live streaming client based on the called co-hosting service. The co-hosting service implements a corresponding co-hosting function. For example, the target type indicates PK co-hosting between the anchors, and in this case, the first live streaming client and the second live streaming client respectively calls the co-hosting service corresponding to the PK co-hosting, and displays a PK interface based on the co-hosting service. The PK interface includes live streaming data corresponding to the first live streaming client, live streaming data corresponding to the second live streaming client, and a PK progress bar.

For example, for co-hosting between anchors, the first terminal calls the co-hosting service by the first live streaming client, wherein the co-hosting instruction is intended to instruct the first live streaming client to perform an operation of sending live streaming data. In the case that the co-hosting is established, live streaming data in the live streaming rooms of the anchors is sent to the server.

In some embodiments, the co-hosting service includes sending live streaming data to the server, and the co-hosting information includes a second interface for establishing a communication connection. In this case, the first terminal establishes a communication connection with the server by calling, in response to the co-hosting acceptance response, the second interface, and sends the live streaming data to the server over the communication connection. The communication connection indicates that the co-hosting with the terminal has been established.

In some embodiments, the co-hosting information further includes a resolution, a display mode of multiple pieces of live streaming data corresponding to the anchors, and the like. The resolution is intended to determine a resolution of the released live streaming data, and the display mode of the multiple pieces of live streaming data is a method of displaying a plurality of live streaming screens in the co-hosting room. For example, for two pieces of live streaming data, the display interface may be divided into a left part and a right part, and the two pieces of live streaming data are displayed respectively based on the resolution in the co-hosting information.

In some embodiments, prior to calling the co-hosting service, the first terminal may further send ready information to a first server, wherein the ready information indicates that the first terminal is ready to establish co-hosting.

In 512, the first terminal generates a co-hosting termination instruction in response to a first co-hosting termination request detected by the first live streaming client.

The co-hosting termination instruction is intended to instruct to terminate the co-hosting between the first live streaming client and the second live streaming client.

In the embodiments of the present disclosure, terminating the co-hosting involves two cases. One is that the first terminal terminates the co-hosting actively, and the other is that the first terminal terminates the co-hosting passively. In some embodiments, in the case of terminating the co-hosting by the anchor, the live streaming interface includes a co-hosting terminate button. In the case that the first anchor wants to terminate the co-hosting, the first anchor operates the co-hosting terminate button, and the first terminal generates the co-hosting termination instruction in response to the first co-hosting termination request detected by the first live streaming client. That is, based on an operation of the user in the live streaming interface detected by the first live streaming client, the first terminal generates the co-hosting termination instruction in response to a trigger operation on the co-hosting terminate button, that is, in response to detecting the first co-hosting termination request.

In some embodiments, in the case that the co-hosting is terminated passively, the first terminal may be affected by the network conditions in the co-hosting process, and as a result, the first terminal can no longer maintain the communication connection with the server; thus, the co-hosting is terminated. In the case that the co-hosting is terminated passively, the first terminal may not generate a co-hosting termination instruction.

In 513, the first terminal acquires, in response to the co-hosting termination instruction, second communication protocol information corresponding to a co-hosting termination process from the configuration information.

In 514, the first terminal terminates the co-hosting with the second live streaming client based on the second communication protocol information.

In the embodiments of the present disclosure, the first terminal determines, in response to the generated co-hosting termination instruction, that the co-hosting with the second live streaming client needs to be terminated, and in this case, the first terminal acquires the second communication protocol information corresponding to the co-hosting termination process from the configuration information.

In some embodiments, the first terminal creates, based on the second communication protocol information, a second co-hosting termination request satisfying the second communication protocol information, and sends the second co-hosting termination request to the server. The server interrupts the communication connection between the first terminal and the second terminal in response to the second co-hosting termination request, thus terminating the co-hosting. The second co-hosting termination request is intended to request the server to terminate the co-hosting between the first live streaming client and the second live streaming client.

In some embodiments, the second communication protocol information specifies a universal request format. Therefore, the first terminal can determine a format of the second co-hosting termination request based on the second communication protocol information, and create, based on the format, the second co-hosting termination request matching the format.

In some embodiments, the second communication protocol information further includes corresponding interface information for sending each request. Therefore, based the second communication protocol information, a third interface for sending the second co-hosting termination request is determined, and the third interface is called to send the second co-hosting termination request to the server.

In some embodiments, in response to interrupting the communication connection between the first terminal and the second terminal, the server returns a co-hosting termination response to the first terminal and the second terminal. The first terminal and the second terminal determine that the co-hosting has been terminated.

In the co-hosting process, the first terminal can determine a current state based on the sent request or received response. In other words, the first terminal maintains a request-driven or response-driven state machine to control the current state of the first terminal in the co-hosting process.

In some embodiments, in response to sending the second co-hosting request and prior to receiving the response from the second terminal, the first terminal determines that the first live streaming client is in a co-hosting waiting state; or in response to receiving the co-hosting acceptance response from the second live streaming client, the first terminal determines that the first live streaming client is in a co-hosting establishing state; or in response to sending the second co-hosting termination request, the first terminal determines that the first live streaming client is in a co-hosting terminating state.

It should be noted that, the first terminal and the second terminal are merely used as an example for description in the embodiments of the present disclosure. In another embodiment, the first terminal can invite a plurality of terminals to join co-hosting. A process of inviting a plurality of terminals to join co-hosting is similar to the process of inviting one terminal to join co-hosting, and details are not described herein again. Each terminal is installed with a live streaming client.

It should be additionally noted that, the first terminal inviting the second terminal to join co-hosting is used as an example for description in the embodiments of the present disclosure. In another embodiment, the second terminal can invite the first terminal to join co-hosting; the co-hosting manner is similar to the co-hosting manner in the above embodiments, and details are not described herein again.

It should be additionally noted that, the first terminal receiving the co-hosting information and establishing co-hosting is used as an example for description in the embodiments of the present disclosure. In another embodiment, the second terminal may also receive the co-hosting information and establish co-hosting; a process of establishing co-hosting by the second terminal is similar to the process of establishing co-hosting by the first terminal, and details are not described herein again.

In the method for co-hosting according to this embodiment of the present disclosure, the configuration information includes the communication protocol information corresponding to the same co-hosting process and the communication protocol information is applicable to different types of co-hosting services. Therefore, for any type of co-hosting service, the communication protocol information can be directly used during establishment of co-hosting. It is no longer necessary to separately develop communication protocol information for different types of co-hosting services, thereby avoiding repeated development of communication protocol information, improving the reusability of the communication protocol information, and reducing the development costs.

In addition, the code compiled based on the communication protocol information is encapsulated into an SDK, so that the SDK includes generic code corresponding to the same co-hosting process, and the generic code is applicable to different types of co-hosting services. Therefore, for any type of co-hosting service, the SDK can be directly used during establishment of co-hosting. It is no longer necessary to develop code corresponding to the same co-hosting process, thereby avoiding repeated code development, and reducing the development costs.

The embodiment as illustrated in FIG. 5 is described using interaction entities including a first terminal, a second terminal, and a server as examples. In other embodiments, the interaction entities may include a first live streaming client, a second live streaming client, and a server. The method includes the following processes.

1. The first live streaming client acquires original configuration information.
2. The first live streaming acquires configuration information by adding address information to the original configuration information.
3. The first live streaming client generates a co-hosting establishment instruction in response to detecting a first co-hosting request.
4. The first live streaming client acquires, in response to the co-hosting establishment instruction, first communication protocol information corresponding to a co-hosting establishment process from the configuration information.
5. The first live streaming client creates, based on the first communication protocol information, a second co-hosting request satisfying the first communication protocol information.
6. The first live streaming client sends the second co-hosting request to the server.
7. The server sends the second co-hosting request to the second live streaming client.
8. The second live streaming client sends a co-hosting acceptance response to the server.
9. The server sends the co-hosting acceptance response and co-hosting information to the first live streaming client.
10. The first live streaming client establishes co-hosting of a target type with the second live streaming client by calling, based on the co-hosting information, a co-hosting service corresponding to the address information in response to the co-hosting acceptance response.
11. The first live streaming client generates a co-hosting termination instruction in response to detecting a first co-hosting termination request.
12. The first live streaming client acquires, in response to the co-hosting termination instruction, second communication protocol information corresponding to a co-hosting termination process.
13. The first live streaming client terminates, based on the second communication protocol information, the co-hosting with the second live streaming client.

The above processes are performed like the practice of the embodiment as illustrated in FIG. 5, which are not described herein again.

One server is involved in the above embodiment shown in FIG. 5. In another embodiment, multiple servers are involved, wherein each server implements a different function.

Figure 6:
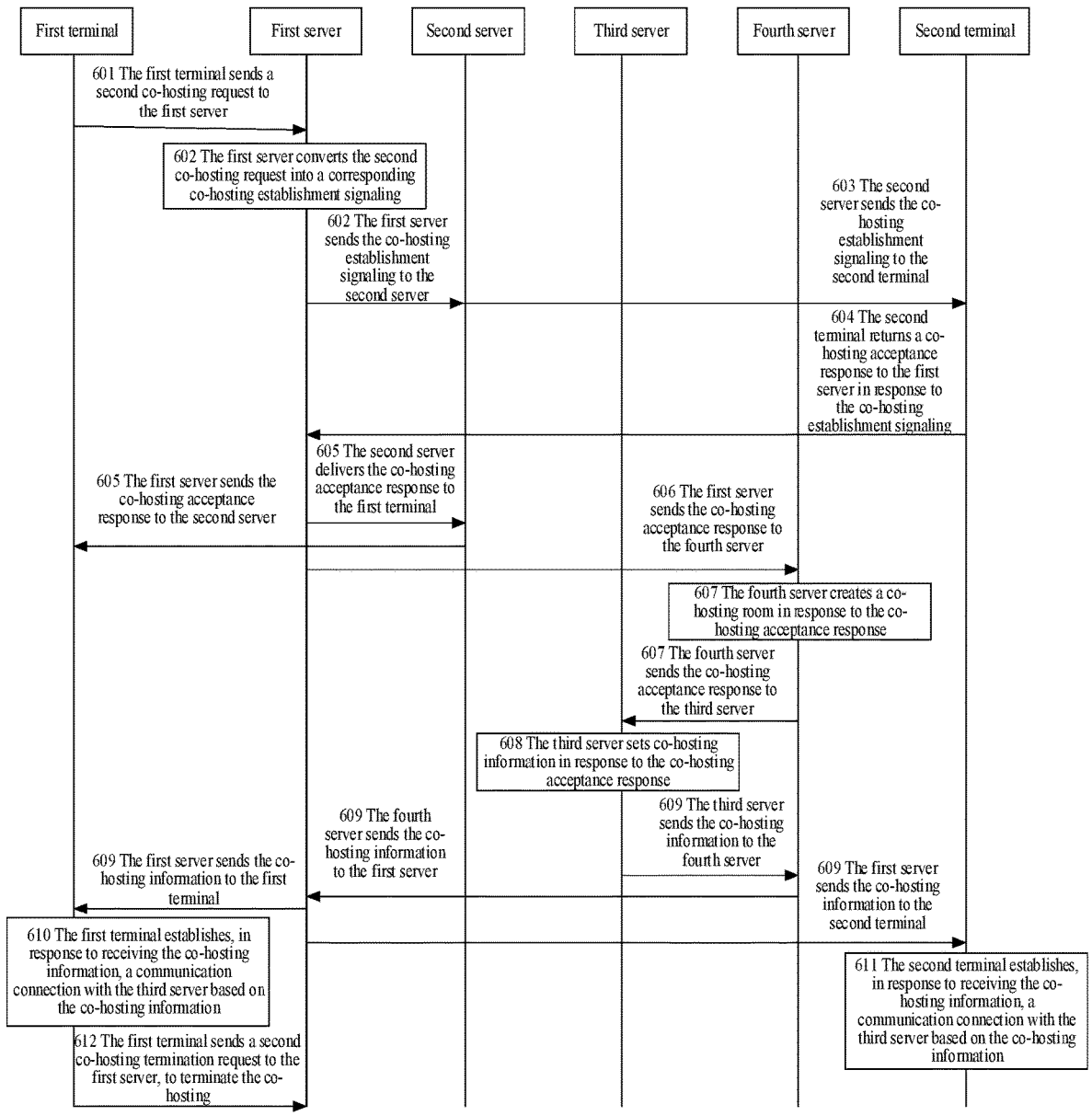
FIG. 6 is a flowchart of another method for co-hosting according to an exemplary embodiment of the present disclosure.

FIG. 6 is a flowchart of another method for co-hosting according to an exemplary embodiment. Referring FIG. 6, interaction entities in the method include a first terminal, a second terminal, a first server, a second server, a third server, and a fourth server. The method includes the following processes:

In 601, the first terminal sends a second co-hosting request to the first server.

In 602, the first server converts the second co-hosting request into a corresponding co-hosting establishment signaling and sends the co-hosting establishment signaling to the second server.

The first terminal and the second terminal are both installed with live streaming clients, and the first server provides services for the live streaming clients.

In some embodiments, PK (competitive and challenging) co-hosting between anchors not only involves processes related to the co-hosting, but also involves giving gifts to the anchors by viewers in live streaming rooms. In this case, the first server processes the gifts from the viewers, determines an anchor who receives more gifts between the two anchors, and considers the determined anchor as the winner in PK.

In the embodiments of the present disclosure, various types of signalings are delivered to the terminal by a signaling server, including: a co-hosting establishment signaling, a co-hosting acceptance signaling, a co-hosting rejection signaling, a co-hosting information signaling, a co-hosting termination signaling, and the like.

In some embodiments, the first server acquires third communication protocol information. The third communication protocol information is communication protocol information corresponding to a process of converting a co-hosting request into a co-hosting signaling. In response to receiving the second co-hosting request, the first server converts the second co-hosting request into a corresponding co-hosting establishment signaling based on the third communication protocol information.

The third SDK is different from the configuration information. The third SDK is an SDK configured in the server, while the configuration information is an SDK configured in the terminal.

In 603, the second server sends the co-hosting establishment signaling to the second terminal. The second server is configured to forward the signaling.

In 604, the second terminal returns a co-hosting acceptance response to the first server in response to the co-hosting establishment signaling.

In 605, the first server sends the co-hosting acceptance response to the second server, and the second server delivers the co-hosting acceptance response to the first terminal.

In 606, the first server sends the co-hosting acceptance response to the fourth server.

In 607, the fourth server creates a co-hosting room in response to the co-hosting acceptance response, and sends the co-hosting acceptance response to the third server.

The fourth server is configured to manage the co-hosting room.

In some embodiments, the first server can receive heartbeat information from any terminal, and the first server sends the heartbeat information to the third server. The heartbeat information is intended to indicate that the terminal is in an online state; in the case that the terminal is in an offline state, the terminal may not send heartbeat information to the first server.

The fourth server determines, based on reception time point of a previous heartbeat signal and a current time point, an interval duration between the reception time point and the current time point, and determines, in response to the interval duration not exceeding a first duration, that the first terminal is in an online state, or determines, in response to the interval duration exceeding the first duration, that the first terminal is in an offline state. The first duration is any duration, such as 1 minute, or 2 minutes.

The fourth server provides a uniform interface in the form of a Remote Procedure Call Protocol (RPC). The fourth server can create a co-hosting room, control a user to enter the room, control a user to leave the room, close the co-hosting room, and manage heartbeats. Interaction with the third server, room state management, and heartbeat management are implemented inside the fourth server. Controlling a user to enter the room means controlling a terminal corresponding to the user to establish a communication connection with the third server, and controlling a user to leave the room means controlling a terminal corresponding to the user to disconnect from the third server.

In 608, the third server sets co-hosting information in response to the co-hosting acceptance response.

The third server is a streaming media server configured to process live streaming data.

The co-hosting information is similar to the co-hosting information in the above embodiment shown in FIG. 5, and is not described in detail again.

In 609, the third server sends the co-hosting information to the fourth server, the fourth server sends the co-hosting information to the first server, and the first server sends the co-hosting information to the first terminal and the second terminal.

In 610, in response to receiving the co-hosting information, the first terminal establishes a communication connection with the third server based on the co-hosting information.

In 611, in response to receiving the co-hosting information, the second terminal establishes a communication connection with the third server based on the co-hosting information.

The first terminal and the second terminal send live streaming data to the third server over the established communication connections. The third server processes the live streaming data, and delivers the processed live streaming data to the live streaming rooms corresponding to the first terminal and the second terminal respectively. The third server implements pulling and pushing live streaming data.

In 612, the first terminal sends a second co-hosting termination request to the first server, to terminate the co-hosting.

Figure 7:
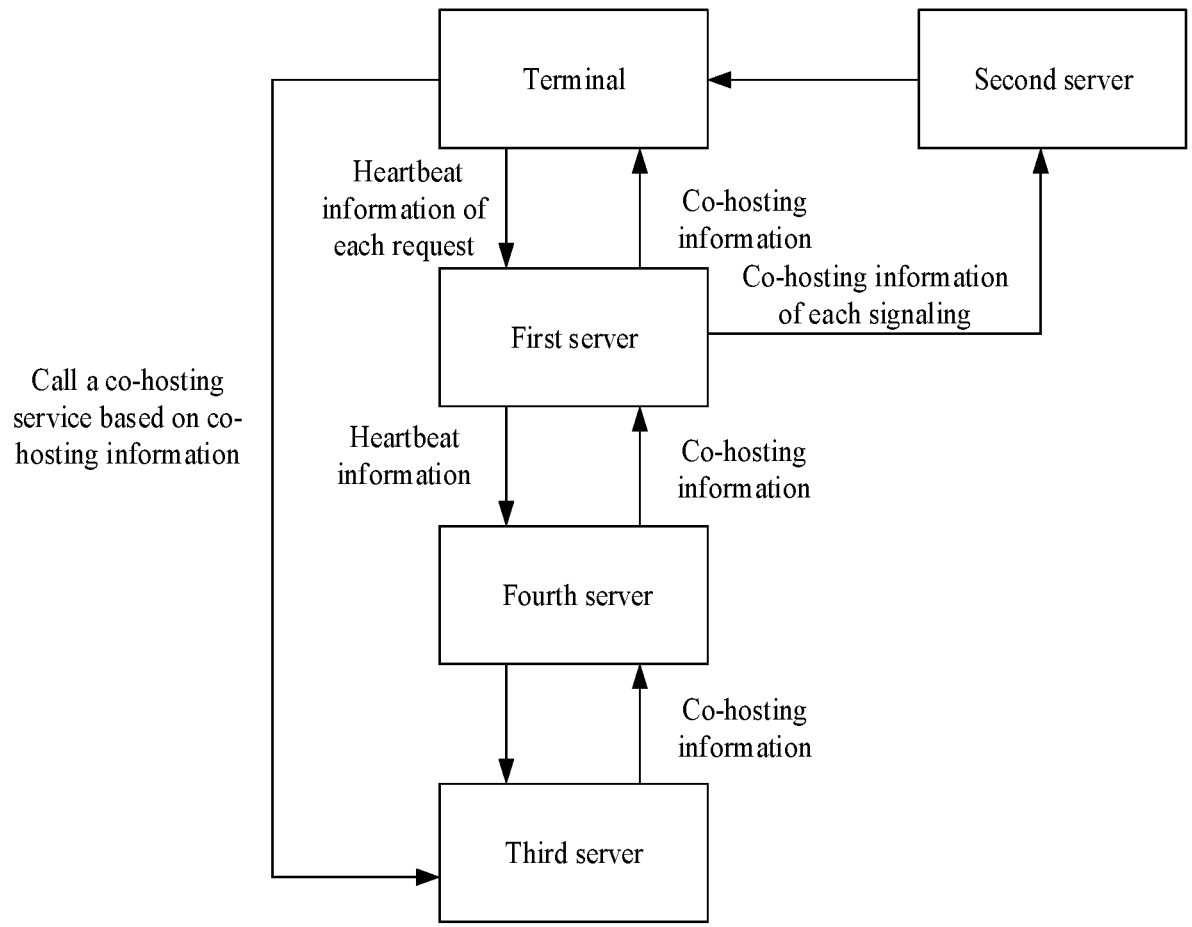
FIG. 7 is a flowchart of another method for co-hosting according to an exemplary embodiment of the present disclosure.

FIG. 7 is a flowchart of interaction among a terminal, a first server, a second server, a third server, and a fourth server. The terminal is connected to the first server and can send various requests to the first server, and the first server can send, in response to the requests, responses to the first server, e.g., a co-hosting request, a co-hosting acceptance response, a co-hosting rejection response, ready information report, co-hosting termination, and heartbeat report. The first server is connected to the second server. The first server can convert various received requests and responses to the requests into a corresponding signaling, and send the signaling to the second server, e.g., a co-hosting establishment signaling, a co-hosting acceptance signaling, a co-hosting rejection signaling, or a co-hosting termination signaling. The terminal is connected to the second server, and the second server can deliver a received signaling to the terminal. The terminal is connected to the third server, and can send live streaming data to the third server. The third server returns processed live streaming data to the terminal. The first server is connected to the fourth server, and the fourth server can manage a co-hosting room based on the request or heartbeat information from the first server. The fourth server is connected to the third server, and can forward the co-hosting information from the third server to the first server and also forward the request from the first server to the third server, thereby avoiding direct interaction between the first server and the third server.

Figure 8:
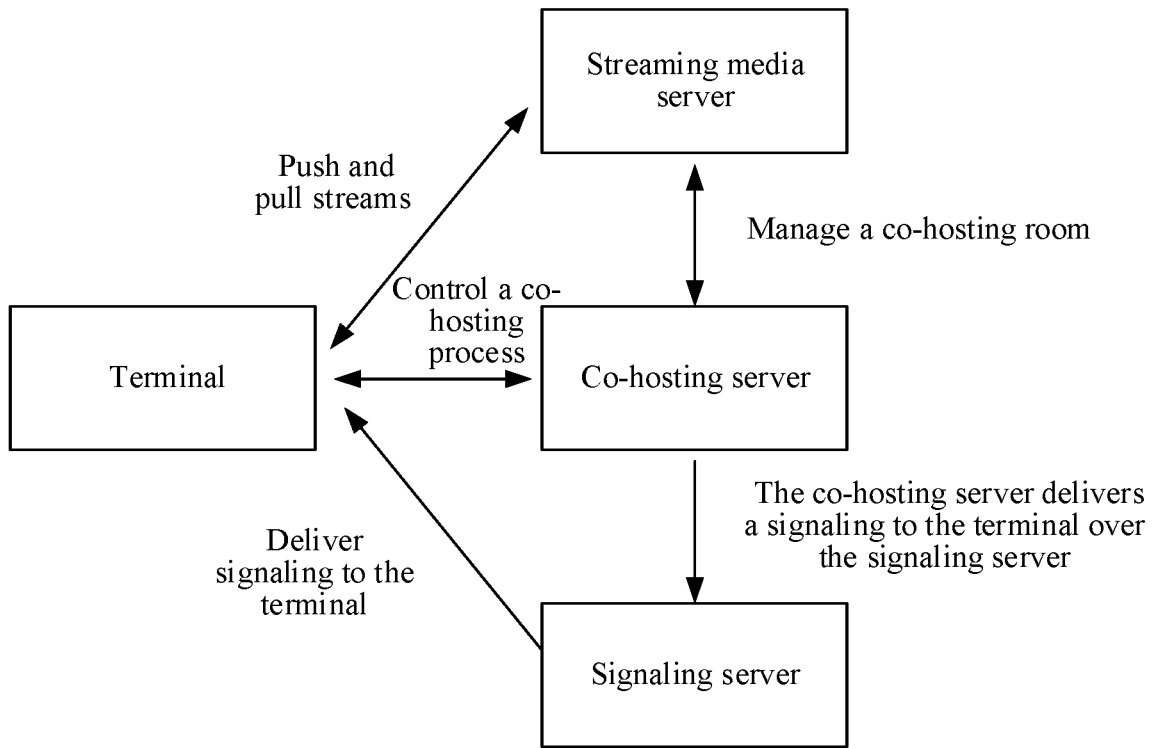
FIG. 8 is a schematic diagram of a method for co-hosting according to a related art.

In the related art, referring to a terminal, a streaming media server, a co-hosting backend server, and a signaling server shown in FIG. 8, the terminal interacts with the co-hosting server to control a co-hosting process; the terminal interacts with the streaming media server to implement stream pushing and pulling; the streaming media server interacts with the co-hosting server, to manage a co-hosting room; the co-hosting server is connected to the signaling server, the signaling server is connected to the terminal, and the co-hosting server delivers a signaling to the terminal over the signaling server. The co-hosting server needs to interact with the streaming media server to control creation of the co-hosting room and user behaviors such as entering and leaving the room, and further needs to maintain state information of the co-hosting room, manage heartbeat information of users, and clear users that fail to send heartbeat information within a specified time, which increases the development costs.

In the embodiments of the present disclosure, the interaction operations that the co-hosting server need to perform with the streaming media server are handed over to the fourth server. By using the fourth server as an intermediate layer, the first server and the third server do not need to interact directly, and the first server does not need to perform room management, which reduces the development costs for the first server. For the fourth server, the room management function in the fourth server is applicable to different types of co-hosting services, thereby avoiding repeated code development.

Figure 9:
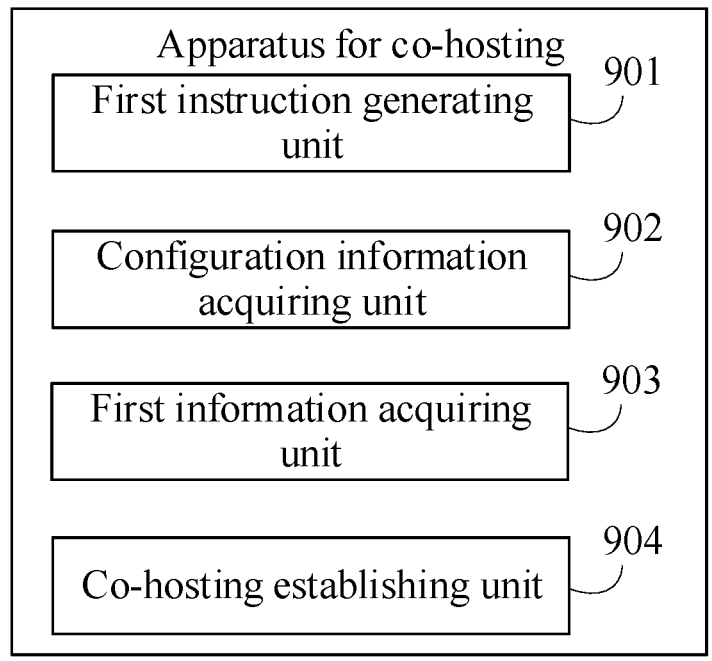
FIG. 9 is a block diagram of an apparatus for co-hosting according to an exemplary embodiment of the present disclosure.

FIG. 9 is a block diagram of an apparatus for co-hosting according to an exemplary embodiment. Referring to FIG. 9, the apparatus includes:

a first instruction generating unit 901, configured to acquire a co-hosting establishment instruction, the co-hosting establishment instruction being intended to instruct a first live streaming client to establish co-hosting with a second live streaming client;

a configuration information acquiring unit 902, configured to acquire configuration information of the first live streaming client in response to the co-hosting establishment instruction, the configuration information including communication protocol information corresponding to a co-hosting establishment process, the co-hosting establishment process being a general process in different types of co-hosting services, the co-hosting process including a co-hosting establishment process;

a first information acquiring unit 903, configured to acquire first communication protocol information corresponding to the co-hosting establishment process from the configuration information; and a co-hosting establishing unit 904, configured to establish the co-hosting with the second live streaming client based on the first communication protocol information.

In the apparatus according to this embodiment of the present disclosure, the configuration information includes the communication protocol information corresponding to the same co-hosting process and the communication protocol information is applicable to different types of co-hosting services. Therefore, for any type of co-hosting service, the communication protocol information can be directly used during establishment of co-hosting. It is no longer necessary to separately develop communication protocol information for different types of co-hosting services, thereby avoiding repeated development of communication protocol information, improving the reusability of the communication protocol information, and reducing the development costs.

In some embodiments, the co-hosting establishment instruction is intended to instruct the first live streaming client to establish co-hosting of a target type with the second live streaming client, and the configuration information further includes address information corresponding to a co-hosting service of the target type; the co-hosting establishing unit 904 is configured to establish the co-hosting of the target type with the second live streaming client by calling, based on the first communication protocol information and the address information, a co-hosting service corresponding to the address information.

Figure 10:
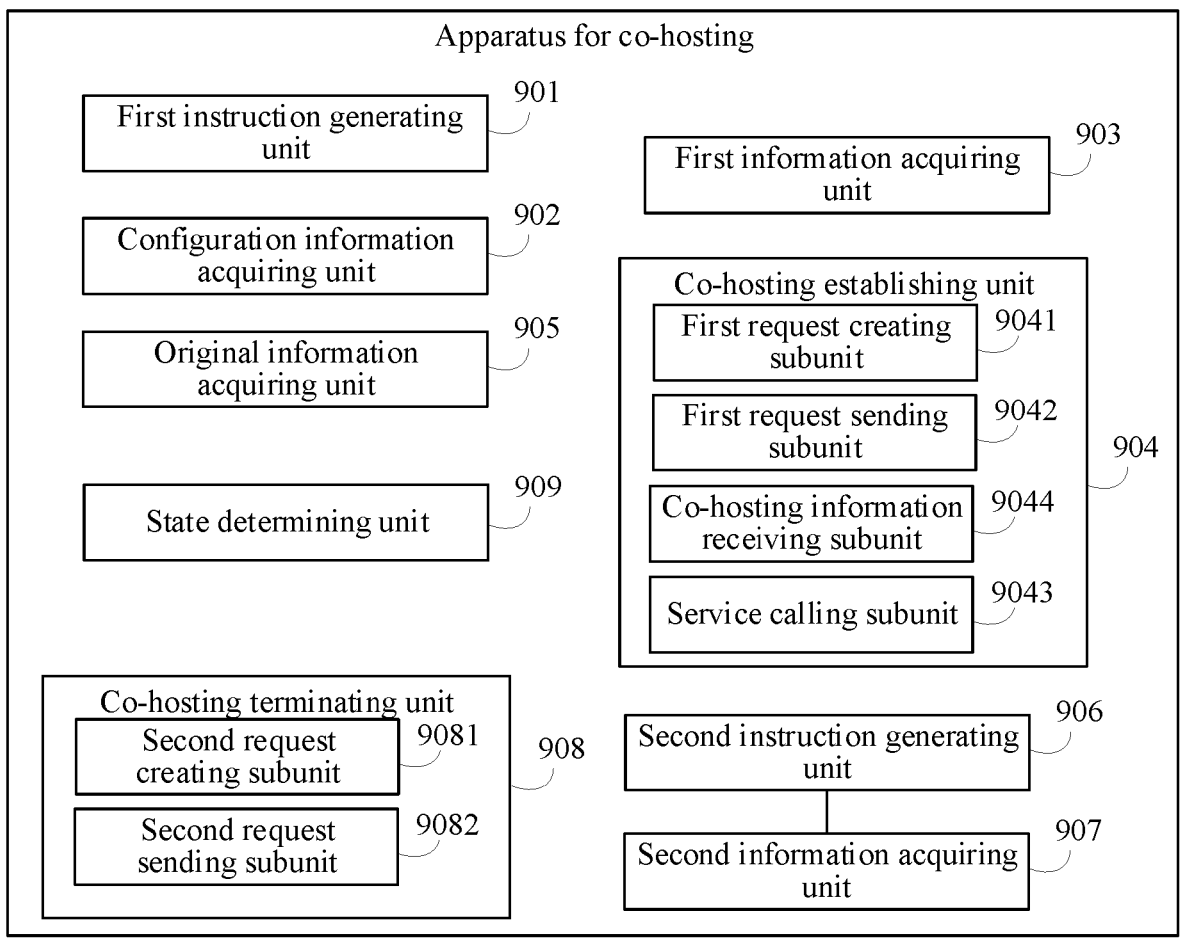
FIG. 10 is a block diagram of another apparatus for co-hosting according to an exemplary embodiment of the present disclosure.

In some embodiments, referring to FIG. 10, the apparatus further includes:

an original information acquiring unit 905, configured to acquire original configuration information, the original configuration information including the communication protocol information corresponding the co-hosting establishment process;

the configuration information acquiring unit 902 is further configured to acquire the configuration information by adding the address information to the original configuration information.

In some embodiments, referring to FIG. 10, the co-hosting establishing unit 904 includes:

a first request creating subunit 9041, configured to create, based on the first communication protocol information, a second co-hosting establishment request satisfying the first communication protocol information, the second co-hosting establishment request being intended to request a server to establish the co-hosting between the first live streaming client and the second live streaming client;

a first request sending subunit 9042, configured to send the second co-hosting establishment request to the server, the server being configured to send the second co-hosting establishment request to the second live streaming client and receive a co-hosting acceptance response from the second live streaming client; and a service calling subunit 9043, configured to establish the co-hosting of the target type with the second live streaming client by calling, in response to the co-hosting acceptance response from the server, the co-hosting service corresponding to the address information.

In some embodiments, referring to FIG. 10, the first request sending subunit 9042 is configured to:

determine, based on the first communication protocol information, a first interface for sending the second co-hosting establishment request; and send the second co-hosting establishment request to the server by calling the first interface.

In some embodiments, referring to FIG. 10, the first request creating subunit 9041 is configured to:

determine, based on the first communication protocol information, a format of the second co-hosting establishment request; and create, based on the format, the second co-hosting establishment request matching the format.

In some embodiments, referring to FIG. 10, the co-hosting establishing unit 904 includes:

a co-hosting information receiving subunit 9044, configured to receive co-hosting information from the server, the co-hosting information being delivered by the server in response to receiving the co-hosting acceptance response from the second live streaming client; and a service calling subunit 9043, configured to call, based on the co-hosting information, the co-hosting service corresponding to the address information in response to the co-hosting acceptance response.

In some embodiments, referring to FIG. 10, the co-hosting service includes sending live streaming data to the server, and the co-hosting information includes a second interface for establishing a communication connection; and the service calling subunit 9043 is configured to:

establish the communication connection with the server by calling, based on the first communication protocol information, the second interface in response to the co-hosting acceptance response, the communication connection indicating that the co-hosting with the second live streaming client has been established; and send the live streaming data to the server over the communication connection In some embodiments, referring to FIG. 10, the co-hosting information includes co-hosting position identifiers, and the co-hosting position identifiers indicate co-hosting positions assigned to the first live streaming client and the second live streaming client for co-hosting; and the service calling subunit 9043 is configured to:

determine, based on the first communication protocol information, a co-hosting position identifier corresponding to the first live streaming client; and release the live streaming data in a co-hosting room based on a co-hosting position corresponding to the co-hosting position identifier.

In some embodiments, referring to FIG. 10, the apparatus further includes:

a second instruction generating unit 906, configured to acquire a co-hosting termination instruction, the co-hosting termination instruction being intended to instruct to terminate the co-hosting between the first live streaming client and the second live streaming client;

a second information acquiring unit 907, configured to acquire, in response to the co-hosting termination instruction, second communication protocol information corresponding to the co-hosting termination process from the configuration information; and a co-hosting terminating unit 908, configured to terminate the co-hosting with the second live streaming client based on the second communication protocol information.

In some embodiments, referring to FIG. 10, the co-hosting terminating unit 908 includes:

a second request creating subunit 9081, configured to create, based on the second communication protocol information, a second co-hosting termination request satisfying the second communication protocol information, the second co-hosting termination request being intended to request a server to terminate the co-hosting between the first live streaming client and the second live streaming client; and a second request sending subunit 9082, configured to send the second co-hosting termination request to the server, the server being configured to terminate the co-hosting with the second live streaming client in response to the second co-hosting termination request.

In some embodiments, referring to FIG. 10, the second request sending subunit 9082 is configured to:

determine, based on the second communication protocol information, a third interface for sending the second co-hosting termination request; and send the second co-hosting termination request to the server by calling the third interface.

In some embodiments, referring to FIG. 10, the apparatus further includes:

a state determining unit 909, configured to determine that the first live streaming client is a co-hosting waiting state in response to sending the second co-hosting establishment request and prior to receiving a response from the second live streaming client; or the state determining unit 909 is further configured to determine, in response to receiving a co-hosting acceptance response from the second live streaming client, that the first live streaming client is in a co-hosting establishing state; or the state determining unit 909 is further configured to determine, in response to sending the second co-hosting termination request, that the first live streaming client is in a co-hosting terminating state.

The operations performed by the units in the apparatus in the above embodiments have been described in detail in the embodiments of the related method, and details are not described herein again.

An embodiment of the present disclosure further provides an electronic device. The electronic device includes at least one processor, and a volatile or non-volatile memory configured to store a computer program runnable by the at least one processor. The at least one processor, when loading and running the computer program, is caused to execute instructions for:

acquiring a co-hosting establishment instruction, the co-hosting establishment instruction being intended to instruct a first live streaming client to establish co-hosting with a second live streaming client;

acquiring configuration information of the first live streaming client in response to the co-hosting establishment instruction, the configuration information including communication protocol information corresponding to a co-hosting establishment process, the co-hosting establishment process being a general process in different types of co-hosting services, the co-hosting process including a co-hosting establishment process;

acquiring first communication protocol information corresponding to the co-hosting establishment process from the configuration information; and establishing the co-hosting with the second live streaming client based on the first communication protocol information.

In some embodiments, the co-hosting establishment instruction is intended to instruct the first live streaming client to establish co-hosting of a target type with the second live streaming client, and the configuration information further includes address information corresponding to a co-hosting service of the target type; and the at least one processor, when loading and running the computer program, is caused to execute an instruction for:

establishing the co-hosting of the target type with the second live streaming client by calling, based on the first communication protocol information and the address information, a co-hosting service corresponding to the address information.

In some embodiments, the at least one processor, when loading and running the computer program, is caused to execute instructions for:

acquiring original configuration information, the original configuration information including the communication protocol information corresponding the co-hosting establishment process; and acquiring the configuration information by adding the address information to the original configuration information.

In some embodiments, the at least one processor, when loading and running the computer program, is caused to execute instructions for:

creating, based on the first communication protocol information, a second co-hosting establishment request satisfying the first communication protocol information, the second co-hosting establishment request being intended to request a server to establish the co-hosting between the first live streaming client and the second live streaming client;

sending the second co-hosting establishment request to the server, the server being configured to send the second co-hosting establishment request to the second live streaming client and receive a co-hosting acceptance response from the second live streaming client; and establishing the co-hosting of the target type with the second live streaming client by calling, in response to the co-hosting acceptance response from the server, the co-hosting service corresponding to the address information.

In some embodiments, the at least one processor, when loading and running the computer program, is caused to execute instructions for:

determining, based on the first communication protocol information, a first interface for sending the second co-hosting establishment request; and sending the second co-hosting establishment request to the server by calling the first interface.

In some embodiments, the at least one processor, when loading and running the computer program, is caused to execute instructions for:

determining, based on the first communication protocol information, a format of the second co-hosting establishment request; and creating, based on the format, the second co-hosting establishment request matching the format.

In some embodiments, the at least one processor, when loading and running the computer program, is caused to execute instructions for:

receiving co-hosting information from the server, the co-hosting information being delivered by the server in response to receiving the co-hosting acceptance response from the second live streaming client; and calling, based on the co-hosting information, the co-hosting service corresponding to the address information in response to the co-hosting acceptance response.

In some embodiments, the co-hosting service includes sending live streaming data to the server, and the co-hosting information includes a second interface for establishing a communication connection; and the at least one processor, when loading and running the computer program, is caused to execute instructions for:

establishing the communication connection with the server by calling, based on the first communication protocol information, the second interface in response to the co-hosting acceptance response, the communication connection indicating that the co-hosting with the second live streaming client has been established; and sending the live streaming data to the server over the communication connection.

In some embodiments, the co-hosting information includes co-hosting position identifiers, the co-hosting position identifiers indicating co-hosting positions assigned to the first live streaming client and the second live streaming client for co-hosting; and the at least one processor, when loading and running the computer program, is caused to execute instructions for:

determining, based on the first communication protocol information, a co-hosting position identifier corresponding to the first live streaming client; and releasing the live streaming data in a co-hosting room based on a co-hosting position corresponding to the co-hosting position identifier.

In some embodiments, the at least one processor, when loading and running the computer program, is caused to execute instructions for:

acquiring a co-hosting termination instruction, the co-hosting termination instruction being intended to instruct to terminate the co-hosting between the first live streaming client and the second live streaming client;

acquiring, in response to the co-hosting termination instruction, second communication protocol information corresponding to the co-hosting termination process from the configuration information; and terminating the co-hosting with the second live streaming client based on the second communication protocol information.

In some embodiments, the at least one processor, when loading and running the computer program, is caused to execute instructions for:

creating, based on the second communication protocol information, a second co-hosting termination request satisfying the second communication protocol information, the second co-hosting termination request being intended to request a server to terminate the co-hosting between the first live streaming client and the second live streaming client; and sending the second co-hosting termination request to the server, the server being configured to terminate the co-hosting with the second live streaming client in response to the second co-hosting termination request.

In some embodiments, the at least one processor, when loading and running the computer program, is caused to execute instructions for:

determining, based on the second communication protocol information, a third interface for sending the second co-hosting termination request; and sending the second co-hosting termination request to the server by calling the third interface.

In some embodiments, the at least one processor, when loading and running the computer program, is caused to execute instructions for:

determining that the first live streaming client is a co-hosting waiting state in response to sending the second co-hosting establishment request and prior to receiving a response from the second live streaming client; or determining, in response to receiving a co-hosting acceptance response from the second live streaming client, that the first live streaming client is in a co-hosting establishing state; or determining, in response to sending the second co-hosting termination request, that the first live streaming client is in a co-hosting terminating state.

Figure 11:
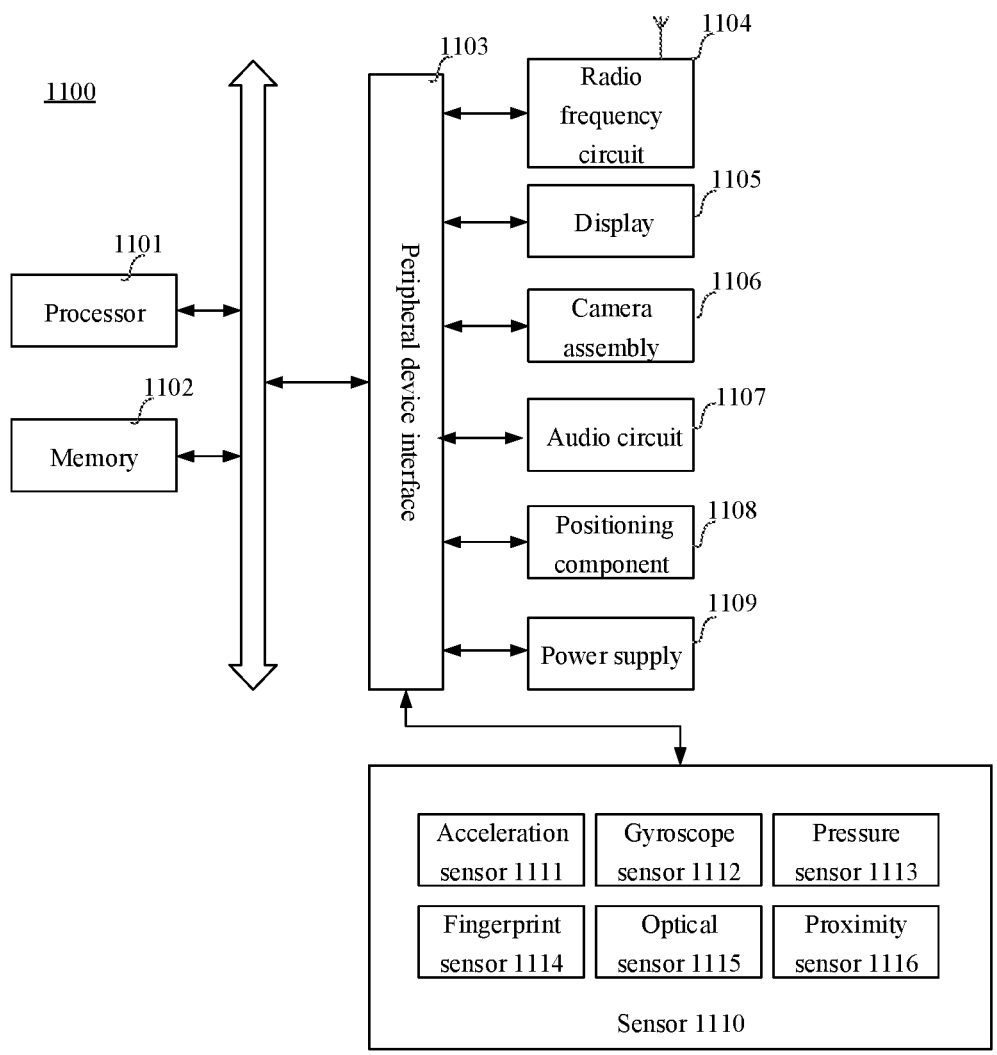
FIG. 11 is a block diagram of a terminal according to an exemplary embodiment of the present disclosure.

In some embodiments, the electronic device is a terminal. FIG. 11 is a block diagram of a terminal 1100 according to an exemplary embodiment. The terminal 1100 may be a portable mobile terminal, for example, a smartphone, a tablet computer, a Moving Picture Experts Group Audio Layer III (MP3) player, a Moving Picture Experts Group Audio Layer IV (MP4) player, a laptop computer, or a desktop computer. The terminal 1100 may also be referred to as user equipment, a portable terminal, a laptop terminal, a desktop terminal, or the like.

Generally, the terminal 1100 includes a processor 1101 and a memory 1102.

The processor 1101 may include one or more processing cores, for example, a 4-core processor or an 8-core processor. The processor 1101 may be implemented by using at least one of the following hardware forms: digital signal processing (DSP), a field-programmable gate array (FPGA), and a programmable logic array (PLA). The processor 1101 may alternatively include a main processor and a coprocessor. The main processor is configured to process data in an awake state, also referred to as a central processing unit (CPU), and the coprocessor is a low-power processor configured to process data in a standby state. In some embodiments, the processor 1101 may be integrated with a graphics processing unit (GPU). The GPU is configured to be responsible for rendering and drawing content that a display needs to display. In some embodiments, the processor 1101 may further include an artificial intelligence (AI) processor. The AI processor is configured to process computing operations related to machine learning.

The memory 1102 may include one or more computer-readable storage media, which may be non-transient. The memory 1102 may further include a high-speed random access memory and a non-volatile memory such as one or more magnetic disk storage devices and a flash storage device. In some embodiments, the non-transitory computer-readable storage medium in the memory 1102 is configured to store at least one instruction. The at least one instruction, when loaded and executed by the processor 1101, causes the processor 101 to perform the method for co-hosting according to the method embodiments of the present disclosure.

In some embodiments, the terminal 1100 may further optionally include a peripheral device interface 1103 and at least one peripheral device. The processor 1101, the memory 1102, and the peripheral device interface 1103 may be connected over a bus or a signal cable. Each peripheral device may be connected to the peripheral device interface 1103 over a bus, a signal cable, or a circuit board. Specifically, the peripheral device includes: at least one of a radio frequency circuit 1104, a display 1105, a camera assembly 1106, an audio circuit 1107, a positioning component 1108, and a power supply 1109.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated into the same chip or circuit board; in some other embodiments, any one or two of the processor 1101, the memory 1102, and the peripheral device interface 1103 may be implemented on an independent chip or circuit board. This is not limited in this embodiment.

The radio frequency circuit 1104 is configured to receive and transmit a radio frequency (RF) signal, also referred to as an electromagnetic signal. The radio frequency circuit 1104 communicates with a communications network and another communications device by using the electromagnetic signal. The radio frequency circuit 1104 may convert an electric signal into an electromagnetic signal for transmission, or convert a received electromagnetic signal into an electric signal. Optionally, the radio frequency circuit 1104 includes: an antenna system, an RF transceiver, one or more amplifiers, a tuner, an oscillator, a digital signal processor, a codec chip set, a subscriber identity module card, and the like. The radio frequency circuit 1104 may communicate with another terminal using at least one wireless communication protocol. The wireless communication protocol includes, but is not limited to: a World Wide Web, a metropolitan area network, an intranet, generations of mobile communication networks (2G, 3G, 4G, and 5G), a wireless local area network and/or a wireless fidelity (Wi-Fi) network. In some embodiments, the radio frequency circuit 1104 may further include a near-field communication (NFC) related circuit, and is not limited in the embodiments of the present disclosure.

The display 1105 is configured to display a user interface (UI). The UI may include a graph, a text, an icon, a video, and any combination thereof. When the display 1105 is a touch display, the display 1105 is further capable of acquiring a touch signal on or above a surface of the display 1105. The touch signal may be inputted as a control signal to the processor 1101 for processing. In this case, the display 1105 may be further configured to provide a virtual button and/or a virtual keyboard, which is also referred to as a soft button and/or a soft keyboard. In some embodiments, there may be one display 1105, disposed on a front panel of the terminal 1100. In some other embodiments, there may be at least two displays 1105, disposed on different surfaces of the terminal 1100 respectively or in a folded design. In some other embodiments, the display 1105 may be a flexible display, disposed on a curved surface or a folded surface of the terminal 1100. Even, the display 1105 may be further set in a non-rectangular irregular pattern, namely, a special-shaped screen. The display 1105 may be prepared by using materials such as a liquid crystal display (LCD), an organic light-emitting diode (OLED), or the like.

The camera assembly 1106 is configured to acquire an image or a video. Optionally, the camera assembly 1106 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a primary camera, a depth-of-field camera, a wide-angle camera, and a telephoto camera, to implement a background blurring function by fusing the main camera and the depth-of-field camera, and panoramic shooting and virtual reality (VR) shooting functions or other fusing shooting functions by fusing the main camera and the wide-angle camera. In some embodiments, the camera assembly 1106 may further include a flash. The flash may be a single color temperature flash, or may be a double color temperature flash. The double color temperature flash is a combination of a warm light flash and a cold light flash, and may be used for light compensation under different color temperatures.

The audio circuit 1107 may include a microphone and a speaker. The microphone is configured to collect sound waves of a user and an environment, and convert the sound waves into electric signals and input the electrical signals into the processor 1101 for processing, or input the electrical signals into the radio frequency circuit 1104 to implement voice communication. For the purpose of stereo sound collection or noise reduction, a plurality of microphones may be configured at different parts of the terminal 1100. The microphone may be further an array microphone or an omnidirectional collection microphone. The speaker is configured to convert electric signals from the processor 1101 or the radio frequency circuit 1104 into sound waves. The speaker may be a conventional thin-film speaker or a piezoelectric ceramic speaker. In a case that the speaker is the piezoelectric ceramic speaker, electric signals not only can be converted into sound waves audible to human, but also can be converted into sound waves inaudible to human for ranging and other purposes. In some embodiments, the audio circuit 1107 may further include an earphone jack.

The positioning component 1108 is configured to position a current geographic location of the terminal 1100 to implement navigation or a location based service (LBS). The positioning component 1108 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power supply 1109 is configured to supply power for various components in the terminal 1100. The power supply 1109 may be an alternating current, a direct current, a disposable battery, or a rechargeable battery. When the power supply 1109 includes the rechargeable battery, the rechargeable battery may be a wired rechargeable battery or a wireless rechargeable battery. The wired rechargeable battery is a battery charged by a wired circuit, and the wireless rechargeable battery is a battery charged by a wireless coil. The rechargeable battery may be further configured to support a fast charge technology.

In some embodiments, the terminal 1100 further includes one or more sensors 1110. The one or more sensors 1110 include, but are not limited to: an acceleration sensor 1111, a gyroscope sensor 1112, a pressure sensor 1113, a fingerprint sensor 1114, an optical sensor 1115, and a proximity sensor 1116.

The acceleration sensor 1111 may detect acceleration on three coordinate axes of a coordinate system established by the terminal 1100. For example, the acceleration sensor 1111 may be configured to detect components of gravity acceleration on the three coordinate axes. The processor 1101 may control, based on a gravity acceleration signal acquired by the acceleration sensor 1111, the display 1105 to display the user interface in a landscape view or a portrait view. The acceleration sensor 1111 may be further configured to collect game or user motion data.

The gyroscope sensor 1112 may detect a body direction and a rotation angle of the terminal 1100. The gyroscope sensor 1112 may cooperate with the acceleration sensor 1111 to collect a 3D action performed by the user on the terminal 1100. The processor 1101 may implement the following functions based on the data acquired by the gyroscope sensor 1112: motion sensing (such as changing the UI based on a tilt operation of the user), image stabilization at shooting, game control, and inertial navigation.

The pressure sensor 1113 may be disposed on a side frame of the terminal 1100 and/or a lower layer of the display 1105. When the pressure sensor 1113 is disposed on the side frame of the terminal 1100, a holding signal of the user on the terminal 1100 may be detected. The processor 1101 performs left and right hand recognition or a quick operation based on the holding signal acquired by the pressure sensor 1113. When the pressure sensor 1113 is disposed on the lower layer of the display 1105, the processor 1101 controls an operable control on the UI based on a pressure operation of the user on the display 1105. The operable control includes at least one of a button control, a scroll bar control, an icon control and a menu control.

The fingerprint sensor 1114 is configured to collect a fingerprint of a user, and the processor 1101 identifies an identity of the user based on the fingerprint acquired by the fingerprint sensor 1114, or the fingerprint sensor 1114 identifies an identity of the user based on the collected fingerprint. When the identity of the user is identified as a trusted identity, the processor 1101 authorizes the user to perform a related sensitive operation. The sensitive operation includes unlocking a screen, viewing encrypted information, downloading software, payment, changing settings, and the like. The fingerprint sensor 1114 may be disposed on a front surface, a back surface, or a side surface of the terminal 1100. When the terminal 1100 is provided with a physical button or a vendor logo, the fingerprint sensor 1114 may be integrated with the physical button or the vendor logo.

The optical sensor 1115 is configured to collect ambient light intensity. In an embodiment, the processor 1101 may control display brightness of the display 1105 based on the ambient light intensity acquired by the optical sensor 1115. Specifically, when the ambient light intensity is relatively high, the display brightness of the display 1105 is turned up. When the ambient light intensity is relatively low, the display brightness of the display 1105 is turned down. In another embodiment, the processor 1101 may further dynamically adjust a camera parameter of the camera assembly 1106 based on the ambient light intensity acquired by the optical sensor 1115.

The proximity sensor 1116, also referred to as a distance sensor, is usually disposed on the front panel of the terminal 1100. The proximity sensor 1116 is configured to collect a distance between a user and the front surface of the terminal 1100. In an embodiment, when the proximity sensor 1116 detects that the distance between the user and the front surface of the terminal 1100 gradually becomes smaller, the display 1105 is controlled by the processor 1101 to switch from a screen-on state to a screen-off state. In a case that the proximity sensor 1116 detects that the distance between the user and the front surface of the terminal 1100 gradually becomes larger, the display 1105 is controlled by the processor 1101 to switch from the screen-off state to the screen-on state.

A person skilled in the art may understand that the structure shown in FIG. 11 does not constitute a limitation to the terminal 1100, and the terminal may include more or fewer components than those shown in the figure, or some components may be combined, or a different component deployment may be used.

Figure 12:
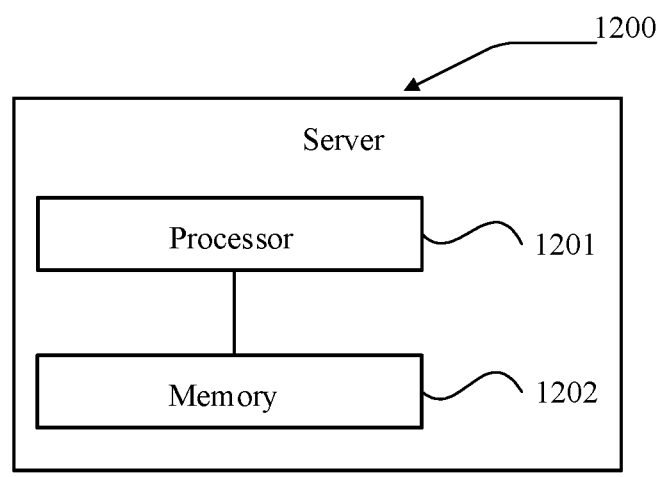
FIG. 12 is a block diagram of a server according to an exemplary embodiment of the present disclosure.

In some embodiments, the electronic device is provided as a server. FIG. 12 is a block diagram of a server 1200 according to an exemplary embodiment. The server 1200 may vary greatly due to different configurations or performance and may include at least one central processing unit (CPU) 1201 and at least one memory 1202, wherein the at least one memory 1202 has at least one instruction stored therein. The at least one instruction, when loaded and executed by the at least one CPU 1201, causes the at least one CPU 1201 to perform the method according to the method embodiments described above. The server may also have components such as a wired or wireless network interface, a keyboard, and an input/output interface, for input and output. The server may further include other components for implementing the functions of the device, which will not be described herein.

The server 1200 may be configured to perform the processes performed by the server in the method for co-hosting.

An embodiment of the present disclosure further provides a non-transitory computer-readable storage medium. The storage medium stores at least one instruction herein. The at least one instruction, when loaded and executed by a processor of an electronic device, the electronic device, causes the electronic device to perform the processes performed by the terminal or server in the method for co-hosting as described above. In some embodiments, the storage medium may be a non-transitory computer-readable storage medium, for example, the non-transitory computer-readable storage medium may be a read-only memory (ROM), a random-access memory (RAM), a compact disc read-only memory (CD-ROM), a magnetic tape, a floppy disk, an optical data storage device, or the like.

An embodiment of the present disclosure further provides a non-transitory computer-readable storage medium. The non-transitory computer-readable storage medium stores a computer program including at least one instruction therein. The computer program, when loaded and run by a processor of an electronic device, causes the electronic device to execute instructions for:

acquiring a co-hosting establishment instruction, the co-hosting establishment instruction being intended to instruct a first live streaming client to establish co-hosting with a second live streaming client;

acquiring configuration information of the first live streaming client in response to the co-hosting establishment instruction, the configuration information including communication protocol information corresponding to a co-hosting establishment process, the co-hosting establishment process being a general process in different types of co-hosting services, the co-hosting process including a co-hosting establishment process;

acquiring first communication protocol information corresponding to the co-hosting establishment process from the configuration information; and establishing the co-hosting with the second live streaming client based on the first communication protocol information.

In some embodiments, the co-hosting establishment instruction is intended to instruct the first live streaming client to establish co-hosting of a target type with the second live streaming client, and the configuration information further includes address information corresponding to a co-hosting service of the target type; and the computer program, when loaded and run by the processor of the electronic device, causes the electronic device to execute an instruction for:

establishing the co-hosting of the target type with the second live streaming client by calling, based on the first communication protocol information and the address information, a co-hosting service corresponding to the address information.

In some embodiments, the computer program, when loaded and run by the processor of the electronic device, causes the electronic device to execute instructions for:

acquiring original configuration information, the original configuration information including the communication protocol information corresponding the co-hosting establishment process; and acquiring the configuration information by adding the address information to the original configuration information.

In some embodiments, the computer program, when loaded and run by the processor of the electronic device, causes the electronic device to execute instructions for:

creating, based on the first communication protocol information, a second co-hosting establishment request satisfying the first communication protocol information, the second co-hosting establishment request being intended to request a server to establish the co-hosting between the first live streaming client and the second live streaming client;

sending the second co-hosting establishment request to the server, the server being configured to send the second co-hosting establishment request to the second live streaming client and receive a co-hosting acceptance response from the second live streaming client; and establishing the co-hosting of the target type with the second live streaming client by calling, in response to the co-hosting acceptance response from the server, the co-hosting service corresponding to the address information.

In some embodiments, the computer program, when loaded and run by the processor of the electronic device, causes the electronic device to execute instructions for:

determining, based on the first communication protocol information, a first interface for sending the second co-hosting establishment request; and sending the second co-hosting establishment request to the server by calling the first interface.

In some embodiments, the computer program, when loaded and run by the processor of the electronic device, causes the electronic device to execute instructions for:

determining, based on the first communication protocol information, a format of the second co-hosting establishment request; and creating, based on the format, the second co-hosting establishment request matching the format.

In some embodiments, the computer program, when loaded and run by the processor of the electronic device, causes the electronic device to execute instructions for:

receiving co-hosting information from the server, the co-hosting information being delivered by the server in response to receiving the co-hosting acceptance response from the second live streaming client; and calling, based on the co-hosting information, the co-hosting service corresponding to the address information in response to the co-hosting acceptance response.

In some embodiments, the co-hosting service includes sending live streaming data to the server, and the co-hosting information includes a second interface for establishing a communication connection; and the computer program, when loaded and run by the processor of the electronic device, causes the electronic device to execute instructions for:

establishing the communication connection with the server by calling, based on the first communication protocol information, the second interface in response to the co-hosting acceptance response, the communication connection indicating that the co-hosting with the second live streaming client has been established; and sending the live streaming data to the server over the communication connection.

In some embodiments, the co-hosting information includes co-hosting position identifiers, the co-hosting position identifiers indicating co-hosting positions assigned to the first live streaming client and the second live streaming client for co-hosting; and the computer program, when loaded and run by the processor of the electronic device, causes the electronic device to execute instructions for:

determining, based on the first communication protocol information, a co-hosting position identifier corresponding to the first live streaming client; and releasing the live streaming data in a co-hosting room based on a co-hosting position corresponding to the co-hosting position identifier.

In some embodiments, the computer program, when loaded and run by the processor of the electronic device, causes the electronic device to execute instructions for:

acquiring a co-hosting termination instruction, the co-hosting termination instruction being intended to instruct to terminate the co-hosting between the first live streaming client and the second live streaming client;

acquiring, in response to the co-hosting termination instruction, second communication protocol information corresponding to the co-hosting termination process from the configuration information; and terminating the co-hosting with the second live streaming client based on the second communication protocol information.

In some embodiments, the computer program, when loaded and run by the processor of the electronic device, causes the electronic device to execute instructions for:

creating, based on the second communication protocol information, a second co-hosting termination request satisfying the second communication protocol information, the second co-hosting termination request being intended to request a server to terminate the co-hosting between the first live streaming client and the second live streaming client; and sending the second co-hosting termination request to the server, the server being configured to terminate the co-hosting with the second live streaming client in response to the second co-hosting termination request.

In some embodiments, the computer program, when loaded and run by the processor of the electronic device, causes the electronic device to execute instructions for:

determining, based on the second communication protocol information, a third interface for sending the second co-hosting termination request; and sending the second co-hosting termination request to the server by calling the third interface.

In some embodiments, the computer program, when loaded and run by the processor of the electronic device, causes the electronic device to execute instructions for:

determining that the first live streaming client is a co-hosting waiting state in response to sending the second co-hosting establishment request and prior to receiving a response from the second live streaming client; or determining, in response to receiving a co-hosting acceptance response from the second live streaming client, that the first live streaming client is in a co-hosting establishing state; or determining, in response to sending the second co-hosting termination request, that the first live streaming client is in a co-hosting terminating state.

An embodiment of the present disclosure further provides a computer program product. The computer program product includes a computer program storing at least one instruction therein. The computer program, when loaded and run by a processor of an electronic device, causes the electronic device to execute instructions for:

acquiring a co-hosting establishment instruction, the co-hosting establishment instruction being intended to instruct a first live streaming client to establish co-hosting with a second live streaming client;

acquiring configuration information of the first live streaming client in response to the co-hosting establishment instruction, the configuration information including communication protocol information corresponding to a co-hosting establishment process, the co-hosting establishment process being a general process in different types of co-hosting services, the co-hosting process including a co-hosting establishment process;

acquiring first communication protocol information corresponding to the co-hosting establishment process from the configuration information; and establishing the co-hosting with the second live streaming client based on the first communication protocol information.

In some embodiments, the co-hosting establishment instruction is intended to instruct the first live streaming client to establish co-hosting of a target type with the second live streaming client, and the configuration information further includes address information corresponding to a co-hosting service of the target type; and the computer program, when loaded and run by the processor of the electronic device, causes the electronic device to execute an instruction for:

establishing the co-hosting of the target type with the second live streaming client by calling, based on the first communication protocol information and the address information, a co-hosting service corresponding to the address information.

In some embodiments, the computer program, when loaded and run by the processor of the electronic device, causes the electronic device to execute instructions for:

acquiring original configuration information, the original configuration information including the communication protocol information corresponding the co-hosting establishment process; and acquiring the configuration information by adding the address information to the original configuration information.

In some embodiments, the computer program, when loaded and run by the processor of the electronic device, causes the electronic device to execute instructions for:

creating, based on the first communication protocol information, a second co-hosting establishment request satisfying the first communication protocol information, the second co-hosting establishment request being intended to request a server to establish the co-hosting between the first live streaming client and the second live streaming client;

sending the second co-hosting establishment request to the server, the server being configured to send the second co-hosting establishment request to the second live streaming client and receive a co-hosting acceptance response from the second live streaming client; and establishing the co-hosting of the target type with the second live streaming client by calling, in response to the co-hosting acceptance response from the server, the co-hosting service corresponding to the address information.

In some embodiments, the computer program, when loaded and run by the processor of the electronic device, causes the electronic device to execute instructions for:

determining, based on the first communication protocol information, a first interface for sending the second co-hosting establishment request; and sending the second co-hosting establishment request to the server by calling the first interface.

In some embodiments, the computer program, when loaded and run by the processor of the electronic device, causes the electronic device to execute instructions for:

determining, based on the first communication protocol information, a format of the second co-hosting establishment request; and creating, based on the format, the second co-hosting establishment request matching the format.

In some embodiments, the computer program, when loaded and run by the processor of the electronic device, causes the electronic device to execute instructions for:

receiving co-hosting information from the server, the co-hosting information being delivered by the server in response to receiving the co-hosting acceptance response from the second live streaming client; and calling, based on the co-hosting information, the co-hosting service corresponding to the address information in response to the co-hosting acceptance response.

In some embodiments, the co-hosting service includes sending live streaming data to the server, and the co-hosting information includes a second interface for establishing a communication connection; and the computer program, when loaded and run by the processor of the electronic device, causes the electronic device to execute instructions for:

establishing the communication connection with the server by calling, based on the first communication protocol information, the second interface in response to the co-hosting acceptance response, the communication connection indicating that the co-hosting with the second live streaming client has been established; and sending the live streaming data to the server over the communication connection.

In some embodiments, the co-hosting information includes co-hosting position identifiers, the co-hosting position identifiers indicating co-hosting positions assigned to the first live streaming client and the second live streaming client for co-hosting; and the computer program, when loaded and run by the processor of the electronic device, causes the electronic device to execute instructions for:

determining, based on the first communication protocol information, a co-hosting position identifier corresponding to the first live streaming client; and releasing the live streaming data in a co-hosting room based on a co-hosting position corresponding to the co-hosting position identifier.

In some embodiments, the computer program, when loaded and run by the processor of the electronic device, causes the electronic device to execute instructions for:

acquiring a co-hosting termination instruction, the co-hosting termination instruction being intended to instruct to terminate the co-hosting between the first live streaming client and the second live streaming client;

acquiring, in response to the co-hosting termination instruction, second communication protocol information corresponding to the co-hosting termination process from the configuration information; and terminating the co-hosting with the second live streaming client based on the second communication protocol information.

In some embodiments, the computer program, when loaded and run by the processor of the electronic device, causes the electronic device to execute instructions for:

creating, based on the second communication protocol information, a second co-hosting termination request satisfying the second communication protocol information, the second co-hosting termination request being intended to request a server to terminate the co-hosting between the first live streaming client and the second live streaming client; and sending the second co-hosting termination request to the server, the server being configured to terminate the co-hosting with the second live streaming client in response to the second co-hosting termination request.

In some embodiments, the computer program, when loaded and run by the processor of the electronic device, causes the electronic device to execute instructions for:

determining, based on the second communication protocol information, a third interface for sending the second co-hosting termination request; and sending the second co-hosting termination request to the server by calling the third interface.

In some embodiments, the computer program, when loaded and run by the processor of the electronic device, causes the electronic device to execute instructions for:

determining that the first live streaming client is a co-hosting waiting state in response to sending the second co-hosting establishment request and prior to receiving a response from the second live streaming client; or determining, in response to receiving a co-hosting acceptance response from the second live streaming client, that the first live streaming client is in a co-hosting establishing state; or determining, in response to sending the second co-hosting termination request, that the first live streaming client is in a co-hosting terminating state.

All the embodiments may be implemented separately, or may be implemented in combination with other embodiments, which are all considered to fall within the projection scope of the present disclosure.

A person skilled in the art can easily envisage other solutions of the present disclosure in consideration of the specification and practice of the disclosure herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that, the present disclosure is not limited to the precise structures that have been described above and shown in the accompanying drawings, and can be modified and changed in many ways without departing from the scope of the present disclosure. The scope of the present disclosure is defined by the appended claims.

What is claimed is:

1. A method for co-hosting, applicable to a terminal, the method comprising:

acquiring a co-hosting establishment instruction, wherein the co-hosting establishment instruction is configured to instruct a first live streaming client to establish co-hosting with a second live streaming client;

acquiring configuration information of the first live streaming client in response to the co-hosting establishment instruction, wherein the configuration information comprises first communication protocol information corresponding to a co-hosting establishment process and second communication protocol information corresponding to a co-hosting termination process, the first communication protocol information corresponding to the co-hosting establishment process is shared between different types of co-hosting services, the second communication protocol information corresponding to the co-hosting termination process is shared between different types of co-hosting services and wherein the different types of co-hosting services comprises services for co-hosting between anchors, and cohosting between an anchor and a viewer;

acquiring, in response to the co-hosting establishment instruction, the first communication protocol information corresponding to the co-hosting establishment process from the configuration information;

establishing the co-hosting with the second live streaming client based on the first communication protocol information;

acquiring a co-hosting termination instruction, wherein the co-hosting termination instruction is configured to instruct the first live streaming client to terminate the co-hosting with the second live streaming client;

acquiring, in response to the co-hosting termination instruction, the second communication protocol information corresponding to the co-hosting termination process from the configuration information; and terminating the co-hosting with the second live streaming client based on the second communication protocol information.

2. The method according to claim 1, wherein the co-hosting establishment instruction is configured to instruct the first live streaming client to establish co-hosting of a target type with the second live streaming client, and the configuration information further comprises address information corresponding to a co-hosting service of the target type; and wherein said establishing the co-hosting with the second live streaming client based on the first communication protocol information comprises:
  establishing the co-hosting of the target type with the second live streaming client by calling, based on the first communication protocol information and the address information, a co-hosting service corresponding to the address information.

3. The method according to claim 2, further comprising:
  acquiring original configuration information, wherein the original configuration information comprises the communication protocol information corresponding the co-hosting process; and
  acquiring the configuration information by adding the address information to the original configuration information, wherein the address information indicates storage addresses corresponding to the different types of co-hosting services.

4. The method according to claim 2, wherein said establishing the co-hosting with the second live streaming client based on the first communication protocol information comprises:
  creating, based on the first communication protocol information, a second co-hosting request satisfying the first communication protocol information, the second co-hosting request is configured to request a server to establish the co-hosting between the first live streaming client and the second live streaming client;
  sending the second co-hosting request to the server, wherein the server is configured to send the second co-hosting request to the second live streaming client and receive a co-hosting acceptance response from the second live streaming client; and
  establishing the co-hosting of the target type with the second live streaming client by calling, in response to the co-hosting acceptance response from the server, the co-hosting service corresponding to the address information.

5. The method according to claim 4, wherein said sending the second co-hosting request to the server comprises:
  determining, based on the first communication protocol information, a first interface for sending the second co-hosting request; and
  sending the second co-hosting request to the server by calling the first interface.

6. The method according to claim 4, wherein said creating, based on the first communication protocol information, the second co-hosting request satisfying the first communication protocol information comprises:
  determining, based on the first communication protocol information, a format of the second co-hosting request; and
  creating, based on the format, the second co-hosting request matching the format.

7. The method according to claim 4, wherein said calling, in response to the co-hosting acceptance response from the server, the co-hosting service corresponding to the address information comprises:
  receiving co-hosting information from the server, wherein the co-hosting information is delivered by the server in response to receiving the co-hosting acceptance response from the second live streaming client; and
  calling, based on the co-hosting information, the co-hosting service corresponding to the address information in response to the co-hosting acceptance response.

8. The method according to claim 7, wherein
the co-hosting service comprises sending live streaming data to the server, and the co-hosting information comprises a second interface for establishing a communication connection; and
wherein said calling, based on the co-hosting information, the co-hosting service corresponding to the address information in response to the co-hosting acceptance response comprises:
  establishing the communication connection with the server by calling, based on the first communication protocol information, the second interface in response to the co-hosting acceptance response, wherein the communication connection indicates that the co-hosting with the second live streaming client has been established; and
  sending the live streaming data to the server over the communication connection.

9. The method according to claim 7, wherein
the co-hosting information comprises co-hosting position identifiers, wherein the co-hosting position identifiers indicate co-hosting positions assigned to the first live streaming client and the second live streaming client for co-hosting; and
wherein said calling, based on the co-hosting information, the co-hosting service corresponding to the address information comprises:
  determining, based on the first communication protocol information, a co-hosting position identifier corresponding to the first live streaming client; and
  releasing the live streaming data in a co-hosting room based on a co-hosting position corresponding to the co-hosting position identifier.

10. The method according to claim 1, wherein said terminating the co-hosting with the second live streaming client based on the second communication protocol information comprises:
  creating, based on the second communication protocol information, a second co-hosting termination request satisfying the second communication protocol information, wherein the second co-hosting termination request is configured to request a server to terminate the co-hosting between the first live streaming client and the second live streaming client; and
  sending the second co-hosting termination request to the server, wherein the server is configured to terminate the co-hosting with the second live streaming client in response to the second co-hosting termination request.

11. The method according to claim 10, wherein said sending the second co-hosting termination request to the server comprises:
  determining, based on the second communication protocol information, a third interface for sending the second co-hosting termination request; and
  sending the second co-hosting termination request to the server by calling the third interface.

12. The method according to claim 1, further comprising:
  determining that the first live streaming client is a co-hosting waiting state in response to sending the second co-hosting request and prior to receiving a response from the second live streaming client; or
  determining, in response to receiving a co-hosting acceptance response from the second live streaming client, that the first live streaming client is in a co-hosting establishing state; or determining, in response to sending a second co-hosting termination request, that the first live streaming client is in a co-hosting terminating state.

13. An electronic device, comprising:
at least one processor; and
a volatile or non-volatile memory configured to store at least one instruction executable by the at least one processor;
wherein the at least one processor, when loading and executing the at least one instruction, is caused to perform:
acquiring a co-hosting establishment instruction, wherein the co-hosting establishment instruction is configured to instruct a first live streaming client to establish co-hosting with a second live streaming client;
acquiring configuration information of the first live streaming client in response to the co-hosting establishment instruction, wherein the configuration information comprises first communication protocol information corresponding to a co-hosting establishment process and second communication protocol information corresponding to a co-hosting termination process the first communication protocol information corresponding to the co-hosting establishment process is shared between different types of co-hosting services, the second communication protocol information corresponding to the co-hosting termination process is shared between different types of co-hosting services, and wherein the different types of co-hosting services comprises services for co-hosting between anchors, and cohosting between an anchor and a viewer;
acquiring, in response to the co-hosting establishment instruction, the first communication protocol information corresponding to the co-hosting establishment process from the configuration information;
establishing the co-hosting with the second live streaming client based on the first communication protocol information;
acquiring a co-hosting termination instruction, wherein the co-hosting termination instruction is configured to instruct the first live streaming client to terminate the co-hosting with the second live streaming client;
acquiring, in response to the co-hosting termination instruction, the second communication protocol information corresponding to the co-hosting termination process from the configuration information; and
terminating the co-hosting with the second live streaming client based on the second communication protocol information.

14. The electronic device according to claim 13, wherein the co-hosting establishment instruction is configured to instruct the first live streaming client to establish co-hosting of a target type with the second live streaming client, and the configuration information further comprises address information corresponding to a co-hosting service of the target type; and
the at least one processor, when loading and executing the at least one instruction, is further caused to perform:
establishing the co-hosting of the target type with the second live streaming client by calling, based on the first communication protocol information and the address information, a co-hosting service corresponding to the address information.

15. The electronic device according to claim 14, wherein the at least one processor, when loading and executing the at least one instruction, is further caused to perform:

acquiring original configuration information, wherein the original configuration information comprises the communication protocol information corresponding the co-hosting process; and
acquiring the configuration information by adding the address information to the original configuration information.

16. The electronic device according to claim 14, wherein the at least one processor, when loading and executing the at least one instruction, is further caused to perform:
creating, based on the first communication protocol information, a second co-hosting request satisfying the first communication protocol information, wherein the second co-hosting request being configured to request a server to establish the co-hosting between the first live streaming client and the second live streaming client;
sending the second co-hosting request to the server, wherein the server is configured to send the second co-hosting request to the second live streaming client and receive a co-hosting acceptance response from the second live streaming client; and
establishing the co-hosting of the target type with the second live streaming client by calling, in response to the co-hosting acceptance response from the server, the co-hosting service corresponding to the address information.

17. The electronic device according to claim 13, wherein the at least one processor, when loading and executing the at least one instruction, is further caused to perform:
creating, based on the second communication protocol information, a second co-hosting termination request satisfying the second communication protocol information, wherein the second co-hosting termination request is configured to request a server to terminate the co-hosting between the first live streaming client and the second live streaming client; and
sending the second co-hosting termination request to the server, wherein the server is configured to terminate the co-hosting with the second live streaming client in response to the second co-hosting termination request.

18. A non-transitory computer-readable storage medium including at least one instruction therein, wherein the at least one instruction, when loaded and executed by a processor of an electronic device, causes the electronic device to perform:
acquiring a co-hosting establishment instruction, wherein the co-hosting establishment instruction is configured to instruct a first live streaming client to establish co-hosting with a second live streaming client;
acquiring configuration information of the first live streaming client in response to the co-hosting establishment instruction, wherein the configuration information comprises first communication protocol information corresponding to a co-hosting establishment process and second communication protocol information corresponding to a co-hosting termination process the first communication protocol information corresponding to the co-hosting establishment process is shared between different types of co-hosting services, the second communication protocol information corresponding to the co-hosting termination process is shared between different types of co-hosting services, and wherein the different types of co-hosting services comprises services for co-hosting between anchors, and cohosting between an anchor and a viewer;
acquiring, in response to the co-hosting establishment instruction, the first communication protocol information corresponding to the co-hosting establishment process from the configuration information;
establishing the co-hosting with the second live streaming client based on the first communication protocol information;
acquiring a co-hosting termination instruction, wherein the co-hosting termination instruction is configured to instruct the first live streaming client to terminate the co-hosting with the second live streaming client;
acquiring, in response to the co-hosting termination instruction, the second communication protocol information corresponding to the co-hosting termination process from the configuration information; and
terminating the co-hosting with the second live streaming client based on the second communication protocol information.

* * * * *